US009933804B2

(12) United States Patent
Janous et al.

(10) Patent No.: US 9,933,804 B2
(45) Date of Patent: Apr. 3, 2018

(54) SERVER INSTALLATION AS A GRID CONDITION SENSOR

(71) Applicant: Microsoft Technology Licensing, LLC, Redmond, WA (US)

(72) Inventors: Brian Janous, Issaquah, WA (US); Gregory Joseph McKnight, Bellevue, WA (US); Sean James, Olympia, WA (US); Ricardo Bianchini, Bellevue, WA (US); Jie Liu, Medina, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/675,163

(22) Filed: Mar. 31, 2015

(65) Prior Publication Data
US 2016/0011618 A1 Jan. 14, 2016

Related U.S. Application Data
(60) Provisional application No. 62/023,777, filed on Jul. 11, 2014.

(51) Int. Cl.
*G05F 1/66* (2006.01)
*G05B 15/02* (2006.01)
*G06Q 50/06* (2012.01)

(52) U.S. Cl.
CPC .............. *G05F 1/66* (2013.01); *G05B 15/02* (2013.01); *G06Q 50/06* (2013.01)

(58) Field of Classification Search
CPC ............ G05F 1/66; G05B 15/02; G06Q 50/06
See application file for complete search history.

(56) References Cited

U.S. PATENT DOCUMENTS 1,363,707 A    12/1920    Beard
2,398,390 A    4/1946    Ogurkowski
(Continued)

FOREIGN PATENT DOCUMENTS

CN    1510570 A    7/2004
CN    101088072 A    12/2007
(Continued)

OTHER PUBLICATIONS

Amazon EC2, captured by the Internet archive at <<https://web.archive.org/web/20130501132521/http://aws.amazon.com/ec2/>>, in May 1, 2013, 15 pages.
(Continued)

*Primary Examiner* — Nathan L Laughlin
(74) *Attorney, Agent, or Firm* — Rainier Patents, P.S.

(57) ABSTRACT

This document relates to analyzing electrical grid conditions using server installations. One example obtains first grid condition signals describing first grid conditions detected by a first server installation during a first time period. The first server installation is connected to a first electrical grid and first previous grid failure events have occurred on the first electrical grid during the first time period. The example also obtains second grid condition signals describing second grid conditions detected by a second server installation during a second time period. The second server installation is connected to a second electrical grid that is geographically remote from the first electrical grid and second previous grid failure events have occurred on the second electrical grid during the second time period. The example also includes using the first grid condition signals and the second grid condition signals to predict a future grid failure event on the second electrical grid.

21 Claims, 7 Drawing Sheets

(56) References Cited

U.S. PATENT DOCUMENTS

| | | |
|---|---|---|
| 5,576,700 A | 11/1996 | Davis et al. |
| 5,742,103 A | 4/1998 | Ashok |
| 6,263,315 B1 | 7/2001 | Talluri |
| 6,452,289 B1 | 9/2002 | Lansberry |
| 6,644,247 B2 | 11/2003 | Campion |
| 6,795,928 B2 | 9/2004 | Bradley et al. |
| 6,812,811 B2 | 11/2004 | Robison et al. |
| 6,868,682 B2 | 3/2005 | Sharma et al. |
| 7,110,913 B2 | 9/2006 | Monroe et al. |
| 7,111,061 B2 | 9/2006 | Leighton et al. |
| 7,122,913 B2 | 10/2006 | Witten et al. |
| 7,127,625 B2 | 10/2006 | Farkas et al. |
| 7,134,011 B2 | 11/2006 | Fung |
| 7,135,956 B2 | 11/2006 | Bartone et al. |
| 7,136,830 B1 | 11/2006 | Kuelbs et al. |
| 7,149,605 B2 | 12/2006 | Chassin et al. |
| 7,272,735 B2 | 9/2007 | Fung |
| 7,318,154 B2 | 1/2008 | Tehee, Jr. |
| 7,321,221 B2 | 1/2008 | Bucker et al. |
| 7,350,186 B2 | 3/2008 | Coleman et al. |
| 7,365,973 B2 | 4/2008 | Rasmussen et al. |
| 7,373,268 B1 | 5/2008 | Viredaz et al. |
| 7,379,884 B2 | 5/2008 | Barsness |
| 7,430,459 B1 | 9/2008 | Papalia et al. |
| 7,437,730 B2 | 10/2008 | Goyal |
| 7,484,111 B2 | 1/2009 | Fung |
| 7,500,001 B2 | 3/2009 | Tameshige et al. |
| 7,525,207 B2 | 4/2009 | Clidaras |
| 7,551,130 B2 | 6/2009 | Altenschulte |
| 7,552,350 B2 | 6/2009 | Fung |
| 7,560,823 B2 | 7/2009 | Schellings |
| 7,568,360 B1 | 8/2009 | Bash et al. |
| 7,604,535 B2 | 10/2009 | Germagian et al. |
| 7,606,719 B2 | 10/2009 | Barsness |
| 7,608,937 B1 | 10/2009 | Altenschulte |
| 7,711,587 B2 | 5/2010 | DeMarcken |
| 7,752,858 B2 | 7/2010 | Johnson et al. |
| 7,797,563 B1 | 9/2010 | Moll |
| 7,820,321 B2 | 10/2010 | Horne |
| 7,844,370 B2 | 11/2010 | Pollack et al. |
| 7,881,057 B2 | 2/2011 | Fink |
| 7,903,407 B2 | 3/2011 | Matsushima et al. |
| 7,923,965 B2 | 4/2011 | Ritter |
| 7,961,463 B2 | 6/2011 | Belady et al. |
| 8,041,967 B2 | 10/2011 | Belady et al. |
| 8,080,898 B2 | 12/2011 | Fukuhara |
| 8,080,900 B2 | 12/2011 | Corhodzic |
| 8,082,454 B2 | 12/2011 | Totten |
| 8,145,731 B2 | 3/2012 | Cherkasova et al. |
| 8,164,897 B2 | 4/2012 | Graybill et al. |
| 8,174,225 B2 | 5/2012 | Mazumdar et al. |
| 8,189,561 B2 | 5/2012 | Karaoguz et al. |
| 8,225,119 B2 | 7/2012 | Jain |
| 8,258,761 B2 | 9/2012 | Hammerstrom |
| 8,271,807 B2 | 9/2012 | Jackson |
| 8,332,666 B2 | 12/2012 | Boss et al. |
| 8,333,316 B2 | 12/2012 | Heath et al. |
| 8,359,125 B2 | 1/2013 | Park |
| 8,364,322 B2 | 1/2013 | Oury et al. |
| 8,370,652 B2 | 2/2013 | Liu et al. |
| 8,401,709 B2 | 3/2013 | Cherian et al. |
| 8,458,011 B2 | 6/2013 | Al-Dawsari |
| 8,588,989 B1 | 11/2013 | Heath et al. |
| 8,595,515 B1 | 11/2013 | Weber et al. |
| 8,645,722 B1 | 2/2014 | Weber et al. |
| 8,650,420 B2 | 2/2014 | Kato et al. |
| 8,839,254 B2 | 9/2014 | Horvitz et al. |
| 8,849,469 B2 | 9/2014 | Belady et al. |
| 9,063,738 B2 | 6/2015 | Jain et al. |
| 9,207,993 B2 | 12/2015 | Jain |
| 9,450,838 B2 | 9/2016 | Jain et al. |
| 9,519,878 B2 | 12/2016 | Sankar et al. |
| 9,654,173 B2 | 5/2017 | Barzegar et al. |
| 2002/0004913 A1 | 1/2002 | Fung |
| 2002/0041126 A1 | 4/2002 | Provanzana et al. |
| 2002/0152305 A1 | 10/2002 | Jackson et al. |
| 2003/0079151 A1 | 4/2003 | Bohrer |
| 2003/0101263 A1 | 5/2003 | Bouillet et al. |
| 2003/0115495 A1 | 6/2003 | Rawson |
| 2003/0193777 A1 | 10/2003 | Friedrich et al. |
| 2003/0196126 A1 | 10/2003 | Fung |
| 2004/0078153 A1 | 4/2004 | Bartone et al. |
| 2004/0177057 A1 | 9/2004 | Fairchild et al. |
| 2004/0236846 A1 | 11/2004 | Alvarez et al. |
| 2004/0267897 A1 | 12/2004 | Hill et al. |
| 2005/0132051 A1 | 6/2005 | Hill |
| 2005/0190912 A1 | 9/2005 | Hopkins et al. |
| 2005/0193113 A1 | 9/2005 | Kokusho |
| 2005/0241810 A1 | 11/2005 | Malone et al. |
| 2005/0256952 A1 | 11/2005 | Mouhanna et al. |
| 2006/0017328 A1 | 1/2006 | Bryde |
| 2006/0017809 A1 | 1/2006 | Carroll |
| 2006/0036878 A1 | 2/2006 | Rothman |
| 2006/0041537 A1 | 2/2006 | Ahmed |
| 2006/0044117 A1* | 3/2006 | Farkas ............... H05K 7/1498 713/340 |
| 2006/0080213 A1 | 4/2006 | Inoue |
| 2006/0184287 A1 | 8/2006 | Belady et al. |
| 2006/0276938 A1 | 12/2006 | Miller |
| 2006/0277109 A1 | 12/2006 | Kerth et al. |
| 2007/0010914 A1 | 1/2007 | Johnson et al. |
| 2007/0049133 A1 | 3/2007 | Conroy et al. |
| 2007/0097636 A1 | 5/2007 | Johnson et al. |
| 2007/0130341 A1 | 6/2007 | Ma |
| 2007/0136392 A1 | 6/2007 | Oh et al. |
| 2007/0250838 A1 | 10/2007 | Belady et al. |
| 2007/0294408 A1 | 12/2007 | Jackson |
| 2008/0028246 A1 | 1/2008 | Witham |
| 2008/0030078 A1 | 2/2008 | Whitted |
| 2008/0049714 A1 | 2/2008 | Commarford et al. |
| 2008/0072090 A1 | 3/2008 | O'Connor |
| 2008/0141048 A1 | 6/2008 | Palmer |
| 2008/0201720 A1 | 8/2008 | Betzler |
| 2008/0234873 A1 | 9/2008 | Gorbatov et al. |
| 2008/0255899 A1 | 10/2008 | McConnell et al. |
| 2008/0313101 A1 | 12/2008 | Helander et al. |
| 2008/0316938 A1 | 12/2008 | Shi |
| 2009/0063122 A1 | 3/2009 | Nasle |
| 2009/0070611 A1 | 3/2009 | Bower, III et al. |
| 2009/0106571 A1 | 4/2009 | Low et al. |
| 2009/0119233 A1 | 5/2009 | Dunagan et al. |
| 2009/0119523 A1 | 5/2009 | Totten |
| 2009/0146815 A1 | 6/2009 | Cho |
| 2009/0201293 A1 | 8/2009 | Tung et al. |
| 2009/0215375 A1 | 8/2009 | Hagensen |
| 2009/0228726 A1 | 9/2009 | Malik et al. |
| 2009/0229194 A1 | 9/2009 | Armillas |
| 2009/0235097 A1 | 9/2009 | Hamilton et al. |
| 2009/0248854 A1 | 10/2009 | Conway |
| 2009/0251860 A1 | 10/2009 | Belady et al. |
| 2009/0254660 A1 | 10/2009 | Hanson |
| 2009/0265568 A1 | 10/2009 | Jackson |
| 2009/0265704 A1 | 10/2009 | Branda et al. |
| 2009/0271046 A1 | 10/2009 | Lewis |
| 2009/0276771 A1 | 11/2009 | Nickolov et al. |
| 2009/0279444 A1 | 11/2009 | Ravindran et al. |
| 2009/0281674 A1* | 11/2009 | Taft ............... G01D 4/002 700/286 |
| 2009/0281846 A1 | 11/2009 | Rose |
| 2009/0295167 A1 | 12/2009 | Clidaras et al. |
| 2009/0319090 A1 | 12/2009 | Dillon et al. |
| 2010/0003545 A1 | 1/2010 | Horne et al. |
| 2010/0017045 A1 | 1/2010 | Nesler et al. |
| 2010/0020806 A1 | 1/2010 | Vandat et al. |
| 2010/0037038 A1 | 2/2010 | Bieswanger |
| 2010/0049616 A1 | 2/2010 | Hipsher |
| 2010/0050172 A1 | 2/2010 | Ferris |
| 2010/0057641 A1 | 3/2010 | Boss |
| 2010/0058350 A1 | 3/2010 | Boss |
| 2010/0060079 A1 | 3/2010 | MacLellan et al. |
| 2010/0061250 A1 | 3/2010 | Nugent |
| 2010/0076615 A1 | 3/2010 | Daniel et al. |
| 2010/0088150 A1 | 4/2010 | Mazhar et al. |
| 2010/0088205 A1 | 4/2010 | Robertson et al. |

(56) References Cited

U.S. PATENT DOCUMENTS

| | | |
|---|---|---|
| 2010/0100696 A1 | 4/2010 | Suzuki |
| 2010/0145801 A1 | 6/2010 | Chekure |
| 2010/0191998 A1 | 7/2010 | Moore |
| 2010/0211669 A1 | 8/2010 | Dalgas et al. |
| 2010/0218186 A1 | 8/2010 | Wolfe et al. |
| 2010/0228819 A1 | 9/2010 | Wei |
| 2010/0235903 A1 | 9/2010 | Carter et al. |
| 2010/0248609 A1 | 9/2010 | Tresh et al. |
| 2010/0250358 A1 | 9/2010 | Elkins, II et al. |
| 2010/0306776 A1 | 12/2010 | Greene |
| 2010/0313203 A1 | 12/2010 | Dawson et al. |
| 2010/0314942 A1 | 12/2010 | Talkin et al. |
| 2010/0318454 A1 | 12/2010 | Warnicke et al. |
| 2010/0319004 A1 | 12/2010 | Hudson et al. |
| 2010/0332373 A1 | 12/2010 | Crabtree et al. |
| 2010/0332401 A1 | 12/2010 | Prahlad et al. |
| 2010/0333105 A1 | 12/2010 | Horvitz et al. |
| 2010/0333116 A1 | 12/2010 | Prahlad et al. |
| 2011/0016214 A1 | 1/2011 | Jackson |
| 2011/0018342 A1 | 1/2011 | Park et al. |
| 2011/0035072 A1 | 2/2011 | Jackson |
| 2011/0055034 A1 | 3/2011 | Ferris et al. |
| 2011/0077795 A1* | 3/2011 | VanGilder ............... G06F 1/206 700/300 |
| 2011/0099095 A1 | 4/2011 | Moore et al. |
| 2011/0105015 A1 | 5/2011 | Carlson |
| 2011/0106321 A1 | 5/2011 | Cherian et al. |
| 2011/0115641 A1 | 5/2011 | Hidalgo Rodrigo |
| 2011/0131309 A1 | 6/2011 | Akiyama et al. |
| 2011/0138708 A1 | 6/2011 | Chazelle et al. |
| 2011/0144818 A1 | 6/2011 | Li et al. |
| 2011/0161526 A1 | 6/2011 | Ravindran |
| 2011/0173465 A1 | 7/2011 | Akers et al. |
| 2011/0205949 A1 | 8/2011 | Maenpaa et al. |
| 2011/0208606 A1 | 8/2011 | Hadar et al. |
| 2011/0231552 A1 | 9/2011 | Carter |
| 2011/0240265 A1 | 10/2011 | Dechene |
| 2011/0271283 A1 | 11/2011 | Bell, Jr. et al. |
| 2011/0276192 A1* | 11/2011 | Ropp ...................... H02J 3/383 700/293 |
| 2011/0276194 A1 | 11/2011 | Emalfarb et al. |
| 2011/0278928 A1 | 11/2011 | Burger et al. |
| 2011/0282982 A1 | 11/2011 | Jain |
| 2011/0288898 A1 | 11/2011 | Roe |
| 2011/0296019 A1 | 12/2011 | Ferris |
| 2012/0016721 A1 | 1/2012 | Weinman |
| 2012/0030356 A1 | 2/2012 | Fletcher |
| 2012/0032631 A1 | 2/2012 | Bourilkov et al. |
| 2012/0053925 A1 | 3/2012 | Geffin et al. |
| 2012/0059532 A1 | 3/2012 | Reifenhauser et al. |
| 2012/0065805 A1 | 3/2012 | Montalvo |
| 2012/0066519 A1 | 3/2012 | El-Essawy et al. |
| 2012/0089726 A1 | 4/2012 | Doddavula |
| 2012/0095940 A1 | 4/2012 | Borgs et al. |
| 2012/0101639 A1* | 4/2012 | Carralero ................ G06F 1/26 700/286 |
| 2012/0109705 A1 | 5/2012 | Belady et al. |
| 2012/0115433 A1 | 5/2012 | Young |
| 2012/0130554 A1 | 5/2012 | Jain et al. |
| 2012/0158447 A1 | 6/2012 | Jain |
| 2012/0181853 A1 | 7/2012 | Plese |
| 2012/0217821 A1 | 8/2012 | Bin Jamlus et al. |
| 2012/0245744 A1 | 9/2012 | Prosser et al. |
| 2012/0259760 A1 | 10/2012 | Sgouridis et al. |
| 2012/0278503 A1 | 11/2012 | DeCusatis et al. |
| 2012/0290725 A1 | 11/2012 | Podilla |
| 2012/0323398 A1 | 12/2012 | Boss et al. |
| 2012/0330711 A1 | 12/2012 | Jain et al. |
| 2012/0331113 A1 | 12/2012 | Jain et al. |
| 2012/0331317 A1 | 12/2012 | Rogers et al. |
| 2013/0015713 A1* | 1/2013 | Hagihara ................ H02J 3/32 307/72 |
| 2013/0041514 A1* | 2/2013 | Apalenek ................ H02J 7/35 700/287 |
| 2013/0054044 A1 | 2/2013 | Shaffer et al. |
| 2013/0063273 A1 | 3/2013 | Bhageria et al. |
| 2013/0086404 A1 | 4/2013 | Sankar et al. |
| 2013/0138482 A1* | 5/2013 | Anderson ........ G06Q 10/06375 705/7.37 |
| 2013/0162215 A1 | 6/2013 | Cooper |
| 2013/0179061 A1 | 7/2013 | Gadh et al. |
| 2013/0191052 A1* | 7/2013 | Fernandez ............... G06F 17/00 702/60 |
| 2013/0201316 A1 | 8/2013 | Binder et al. |
| 2013/0212410 A1 | 8/2013 | Li et al. |
| 2013/0232094 A1* | 9/2013 | Anderson ........... G05B 23/0229 706/12 |
| 2013/0261817 A1 | 10/2013 | Detmers et al. |
| 2013/0274947 A1 | 10/2013 | Miller et al. |
| 2013/0318371 A1 | 11/2013 | Hormuth |
| 2013/0345888 A1 | 12/2013 | Forbes |
| 2014/0025220 A1 | 1/2014 | Carlson et al. |
| 2014/0039965 A1 | 2/2014 | Steven et al. |
| 2014/0075222 A1 | 3/2014 | Jackson |
| 2014/0142767 A1* | 5/2014 | Hjelm ...................... H02J 3/14 700/286 |
| 2014/0365402 A1 | 12/2014 | Belady et al. |
| 2015/0015213 A1* | 1/2015 | Brooks ..................... H02J 3/24 320/137 |
| 2016/0011575 A1 | 1/2016 | Liu et al. |
| 2016/0011607 A1 | 1/2016 | James et al. |
| 2016/0011616 A1 | 1/2016 | Janous et al. |
| 2016/0011617 A1 | 1/2016 | Liu et al. |
| 2016/0013647 A1 | 1/2016 | Liu et al. |
| 2016/0013652 A1 | 1/2016 | Li et al. |
| 2016/0013980 A1 | 1/2016 | McKnight et al. |
| 2016/0344595 A1 | 11/2016 | Jain et al. |

FOREIGN PATENT DOCUMENTS

| | | |
|---|---|---|
| CN | 100458605 C | 2/2009 |
| CN | 101430596 A | 5/2009 |
| CN | 101916415 A | 12/2010 |
| CN | 101096942 B | 3/2013 |
| EP | 2287991 A1 | 2/2011 |
| EP | 2511870 A1 | 10/2012 |
| EP | 2701261 A1 | 2/2014 |
| EP | 2701266 A1 | 2/2014 |
| JP | 2003-162591 | 6/2003 |
| JP | 2003-324956 | 11/2003 |
| JP | 2006-508445 A | 3/2006 |
| JP | 2007-249470 | 9/2007 |
| JP | 2007-324956 | 12/2007 |
| KR | 10-2005-0084874 | 8/2005 |
| KR | 10-2009-0120704 A | 11/2009 |
| WO | 2004/049157 A2 | 6/2004 |
| WO | 2004/092971 A1 | 10/2004 |
| WO | 2009/012451 A2 | 1/2009 |
| WO | 2010/010544 A2 | 1/2010 |

OTHER PUBLICATIONS

Kirkpatrick, Scott, "Optimization by Simulated Annealing: Quantitative Studies", Journal of Statistical Physics, vol. 34, No. 5, 1984, pp. 975-986, 12 pages.

Sharma et al., "Cloudy Computing: Leveraging Weather Forecasts in Energy Harvesting Sensor Systems", International Conference on Sensor Mesh and Ad Hoc Communications and Networks, Jun. 2010, 9 pages.

Delft University of Technology, "The Grid Workloads Archive", captured by the Internet archive at 20051028161139/http://gwa.ewi.tudelft.nl/pmwiki.pmwiki/php?n=Workloads.Gwa-t-2>> on May 4, 2013, 2 pages.

"Grid5000 Experimentation Platform", captured by the Internet archive at <<https://web.archive.org/web/20051028161139/http://www.grid5000.fr>>, on Oct. 28, 2005, 1 page.

Feitelson, D., "Parallel Workload Archive", retrieved from <<http://www.cs.huji.ac.il/-labs/parallel/workload/l_anl_int/index.html>>, 2009, 5 pages.

Energy Information Administration, "Average Retail Price of Electricity to Ultimate Customers by End-Use Sector, by State",

(56) References Cited

OTHER PUBLICATIONS retrieved from <<http://www.eia.gov/electricity/monthly/epm table grapher.cfm?-t=epmt_5_6_b>>, Jan. 2013, 190 pages.
GreenQloud, captured by the Internet archive at <<https://web.archive.org/web/20130223025741/http://greenqloud.com/pricing/>>, on Feb. 23, 2013, 2 pages.
Amazon EC2 Pricing, captured by the Internet archive at <<https://web.archive.org/web/20130307213605/http://aws.amazon.com/pricing/ec2/>>, in Mar. 7, 2013, 9 pages.
Gurobi Optimization Inc., "Gurobi Optimization", captured by the Internet archive at <<https://web.archive.org/web/20140701004029/http://www.gurobi.com/>>, on Jul. 1, 2014, 2 pages.
Govindan et al., "Benefits and Limitations of Tapping into Stored Energy for Datacenters", Proceedings of the International Sympoisum on Computer Architecture, Jun. 4-8, 2011, 11 pages.
Haque et al., "Providing Green SLAs in High Performance Computing Clouds", Proceedings of the Sustainable Computing and Comuting for Sustainability International Green Computing Conference, Jun. 27, 2013, 11 pages.
Analog Devices, "EVAL-ADM 1911/EVAL-ADM 1192 User Guide UG-658" retrieved from <<http://www.analog.com/media/en/technical-documentation/evaluation-documentation/EVAL-ADM1191_ADM1192.pdf>>, 2008-2014, pp. 1-24, 24 pages.
Analog Devices, "USB-SDP_CABLEZ User Guide UG-404", retrieved from <<http://www.analog.com/media/en/technical-documentation/user-guides/UG-404.pdf>>, 2012, pp. 1-12, 12 pages.
Analog Devices, "Digital Power Monitor with Convert Pin and ALERTB Output", ADM1191 Data Sheet, retrieved from <<http://www.analog.com/media/en/technical-documentation/data-sheets/ADM1191.pdf>>, 2006-2012, pp. 1-16, 16 pages.
Analog Devices, "ADM1191: Digital Power Monitor with Convert Pin and ALERTB Output", Datasheet and Product Info, retrieved from <<http://www.analog.com/en/products/power-management/power-monitors/adm1191.html>>, 1995-2015, pp. 1-7, 7 pages.
U.S. Appl. No. 62/023,777 titled "Server Installation as a Grid Condition Sensor" filed Jul. 11, 2014 by Inventors Jie Liu, Brian Janous, Gregory Joesph McKnight, Sean James and Ricardo Bianchini, 30 pages.
Response and Demand filed Jan. 13, 2016 to the International Search Report and Written Opinion dated Sep. 30, 2015 from PCT Patent Application No. PCT/US2015/039462, 11 pages.
Second Written Opinion dated Apr. 21, 2016 from PCT Patent Application No. PCT/US2015/039462, 6 pages.
Chiu, et al., "Electric Grid Balancing through Low-Cost Workload Migration", In ACM SIGMETRICS Performance Evaluation Review, vol. 40 Issue 3, Dec. 2012, 5 pages.
Wang, et al., "Datacenters as Controllable Load Resources in the Electricity Market", In IEEE 33rd International Conference on Distributed Computing Systems, Jul. 8, 2013, 10 pages.
Wang, et al., "Exploring Smart Grid and Data Center Interactions for Electric Power Load balancing", In ACM SIGMETRICS Performance Evaluation Review, vol. 41, Issue 3, Dec. 2013, 6 pages.
Mohsenian-Rad, et al., "Coordination of Cloud Computing and Smart Power Grids", In First IEEE International Conference on Smart Grid Communications (SmartGridComm), Oct. 4, 2010, 5 pages.
Ganti, et al., "Smart Grid as a Driver for Energy-Intensive Industries: A Data Center Case Study", In Proceedings of Grid-Interop, Dec. 3, 2012, 7 pages.
Wang, et al., "Coordination of the Smart Grid and Distributed Data Centers: A Nested Game-Based Optimization Framework", In IEEE PES Innovative Smart Grid Technologies Conference, Feb. 19, 2014, 5 pages.
International Search Report and Written Opinion dated Sep. 30, 2015 from PCT Patent Application No. PCT/US2015/039462, 10 pages.
International Preliminary Report on Patentability dated Jul. 12, 2016 from PCT Patent Application No. PCT/US2015/039462, 7 pages.
Mankoff et al., "Some Computer Science Issues in Creating a Sustainable World", Computer, vol. 41, No. 8, 2008, pp. 94-97, 4 pages.
Global Reporting Initiative, captured by the Internet archive at <<http://web.archive.org/web/20140625183534/https://www.globalreporting.org/Pages/default.aspx>>, on Jun. 25, 2014, 2 pages.
Green House Data, captured by the Internet archive at <<http://web.archive.org/web/20140625065009/http://www.greenhousedata.com/>>, on Jun. 25, 2014, 2 pages.
AISO.net, captured by the Internet archive at <<http://web.archive.org/web/20140704021857/http://www.aiso.net/>>, Jul. 4, 2014, 1 page.
GreenQloud, captured by the Internet archive at <<http://web.archive.org/web/20140629201826/https://www.greenqloud.com/>>on Jun. 29, 2014, 4 pages.
Green House Data, captured by the Internet archive at <<http://web.archive.org/web/20140701072144/http://www.greenhousedata.com/about-us/green-data-centers/>>, on Jul. 1, 2014, 3 pages.
UK Government, "Carbon Reduction Commitment", captured by the Internet archive at <<https://web.archive.org/web/20110311230843/http://www.carbonreductioncommitment.info/>> on Mar. 11, 2011, 3 pages.
Apple Inc., "Apple and the Environment", captured by the Internet archive at <<https://web.archive.org/web/20130201101842/http://www.apple.com/-environment/renewable-energy/>>, on Feb. 1, 2013, 4 pages.
Miller, Rich, "Data Centers Scale Up Their Solar Power," retrieved at <<http://www.datacenterknowledge.com/archives/2012/05/14/data-centers-scales-up-their-solar-power/>>, May 14, 2012, 2 pages.
EcoBusinessLinks, captured by the Internet archive at <<https://web.archive.org/web/20130122202308/http://www.ecobusinesslinks.com/green webhosts/>>, on Jan. 22, 2013, 4 pages.
Klingert et al., "GreenSLAs for the Energy-Efficient Management of Data Centres", International Conference on Energy-Efficient Computing and Networking, May 31-Jun. 1, 2011, 10 pages.
Deng et al., "Concentrating Renewable Energy in Grid-Tied Datacenters", Proceedings of the International Symposium on Sustainable Systems and Technology, May 2011, 6 pages.
Li et al., "iSwitch: Coordinating and Optimizing Renewable Energy Powered Server Clusters", International Symposium on Computer Architecture, Jun. 2012, 12 pages.
Aksanli et al., "Utilizing Green Energy Prediction to Schedule Mixed Batch and Service Jobs in Data Centers", Proceedings of the 4th Workshop on Power-Aware Computing and Systems, Oct. 23, 2011, 5 pages.
Goiri et al., "GreenSlot: Scheduling Energy Consumption in Green Datacenters", International Conference for High Performance Computing, Networking, Storage and Analysis, Nov. 12-18, 2011, 11 pages.
Goiri et al., "GreenHadoop: Leveraging Green Energy in Data-Processing Frameworks", ACM European Conference on Computer Systems, Apr. 10-13, 2012, 14 pages.
Goiri et al., "Parasol and GreenSwitch: Managing Datacenters Powered by Renewable Energy", International Conference on Architectural Support for Programming Languages and Operating Systems, Mar. 16-20, 2013, 13 pages.
Krioukov et al., "Integrating Renewable Energy Using Data Analytics Systems: Challenges and Opportunities", Bulletin of the IEEE Computer Society Technical Committee on Data Engineering, Mar. 2011, 9 pages.
Krioukov et al., "Design and Evaluation of an Energy Agile Computing Cluster", University of California at Berkeley, Technical Report No. UBC/EECS-2012-13, Jan. 17, 2012, 14 pages.
Le et al., "Cost- and Energy-Aware Load Distribution Across Data Centers", Workshop on Power Aware Computing and Systems, Oct. 2009, 5 pages.

(56) References Cited

OTHER PUBLICATIONS

Liu et al., "Renewable and Cooling Aware Workload Management for Sustainable Data Centers", International Conference on Measurement and Modeling of Computer Systems, Jun. 11-15, 2012, 12 pages.
Sharma et al., "Blink: Managing Server Clusters on Intermittent Power", International Conference on Architectural Support for Programming Languages and Operating Systems, Mar. 5-11, 2011, 14 pages.
Stewart, Christopher and Kai Shen, "Some Joules Are More Precious Than Others: Managing Renewable Energy in The Datacenter", Workshop on Power Aware Computing and Systems, Oct. 2009, 5 pages.
Bobroff et al., "Dynamic Placement of Virtual Machines for Managing SLA Violations", IFIP/IEEE International Symposium on Integrated Network Management, May 2007, 10 pages.
Breitgand, David and Amir Epstein, "SLA-aware placement of multi-virtual machine elastic services in compute clouds", International Symposium on Integrated Network Management, May 2011, 9 pages.
Goiri et al., "Energy-aware Scheduling in Virtualized Datacenters", IEEE International Conference on Cluster Computing, Sep. 2010, 10 pages.
Le et al., "Reducing Electricity Cost Through Virtual Machine Placement in High Performance Computing Clouds", International Conference for High Performance Computing, Networking, Storage and Analysis, Nov. 12-18, 2011, 12 pages.
Verma et al., "pMapper: Power and Migration Cost Aware Application Placement in Virtualized Systems", International Middleware Conference, Dec. 2008, pp. 243-264, 22 pages.
Pelley et al., "Power Routing: Dynamic Power Provisioning in the Data Center", International Conference on Architectural Support for Programming Languages and Operating Systems, Mar. 13-17, 2010, 12 pages.
Maxim Integrated, "Switching Between Battery and External Power Sources", retrieved at <<http://www.maximintegrated.com/app-notes/index.mvp/id/1136>>, in Feb. 2013, 4 pages.
Notice of Allowance dated Apr. 2, 2012 from U.S. Appl. No. 12/391,188, 5 pages.
International Search Report and Written Opinion dated Sep. 30, 2010 from PCT Patent Application No. PCT/US2010/023253, 9 pages.
International Preliminary Report on Patentability dated Aug. 23, 2011 from PCT Patent Application No. PCT/US2010/023253, 5 pages.
First Office Action dated Jul. 29, 2013 from Chinese Patent Application No. 201080009556.7, 11 pages.
Response filed Dec. 9, 2013 to the First Office Action dated Jul. 29, 2013 from Chinese Patent Application No. 201080009556.7, 15 pages.
Second Office Action dated Feb. 21, 2014 from Chinese Patent Application No. 201080009556.7, 10 pages.
Response filed May 7, 2014 to the Second Office Action dated Feb. 21, 2014 from Chinese Patent Application No. 201080009556.7, 16 pages.
Decision on Rejection dated Jul. 31, 2014 from Chinese Patent Application No. 201080009556.7, 7 pages.
Response filed Nov. 14, 2014 to the Decision on Rejection dated Jul. 31, 2014 from Chinese Patent Application No. 201080009556.7, 12 pages.
Decision on Reexamination dated Dec. 16, 2014 from Chinese Patent Application No. 201080009556.7, 3 pages.
Third Office Action dated Dec. 31, 2014 from Chinese Patent Application No. 201080009556.7, 7 pages.
Response filed Mar. 4, 2015 to the Third Office Action dated Dec. 31, 2014 from Chinese Patent Application No. 201080009556.7, 15 pages.
Notice on Grant dated Apr. 13, 2015 from Chinese Patent Application No. 201080009556.7, 7 pages.
Communication and Extended European Search Report dated Nov. 14, 2012 from European Patent Application No. 10744134.7, 6 pages.
Communication pursuant to Rules 70(2) and 70a(2) EPC dated Dec. 3, 2012 from European Patent Application No. 10744134.7, 1 page.
Response filed Jan. 30, 2013 to the Communication pursuant to Rules 70(2) and 70a(2) EPC dated Dec. 3, 2012 from European Patent Application No. 10744134.7, 15 pages.
Examination Report dated Oct. 17, 2014 from European Patent Application No. 10744134.7, 7 pages.
Response filed Feb. 16, 2015 to the Examination Report dated Oct. 17, 2014 from European Patent Application No. 10744134.7, 10 pages.
Examination Report dated Aug. 10, 2015 from European Patent Application No. 10744134.7, 6 pages.
Response filed Dec. 8, 2015 to the Examination Report dated Aug. 10, 2015 from European Patent Application No. 10744134.7, 11 pages.
Examination Report dated Mar. 21, 2016 from European Patent Application No. 10744134.7, 5 pages.
Response filed Apr. 12, 2016 to the Examination report dated Mar. 21, 2016 from European Patent Application No. 10744134.7, 17 pages.
Intention to Grant dated Jul. 15, 2016 from European Patent Application No. 10744134.7, 36 pages.
Decision to Grant dated Oct. 13, 2016 from European Patent Application No. 10744134.7, 2 pages.
Amendment dated Jan. 30, 2013 from Japanese Patent Application No. 2011-551110, 7 pages.
Notice of Rejection dated Jul. 2, 2013 from Japanese Patent Application No. 2011-551110, 9 pages.
Response filed Oct. 2, 2013 to the Notice of Rejection dated Jul. 2, 2013 from Japanese Patent Application No. 2011-551110, 11 pages.
Second Office Action dated Mar. 11, 2014 from Japanese Patent Application No. 2011-551110, 11 pages.
Response filed Jun. 11, 2014 to the Second Office Action dated Mar. 11, 2014 from Japanese Patent Application No. 2011-551110, 16 pages.
Notice of Allowance dated Nov. 11, 2014 from Japanese Patent Application No. 2011-551110, 7 pages.
Response filed Feb. 17, 2017 to the Requirement for Restriction Election dated Dec. 15, 2016 from U.S. Appl. No. 14/464,650, 7 pages.
Non-Final Office Action dated Mar. 10, 2017 from U.S. Appl. No. 14/464,650, 107 pages.
Communication pursuant to Rules 161(1) and 162 EPC dated Feb. 17, 2017 from European Patent Application No. 15741442.6, 2 pages.
Preliminary Amendment filed Aug. 20, 2014 from U.S. Appl. No. 14/464,650, 8 pages.
Requirement for Restriction Election dated Dec. 15, 2016 from U.S. Appl. No. 14/464,650, 9 pages.
Requirement for Restriction Election dated Jun. 22, 2012 from U.S. Appl. No. 12/951,977, 6 pages.
Response filed Jul. 23, 2012 to the Requirement for Restriction Election dated Jun. 22, 2012 from U.S. Appl. No. 12/951,977, 7 pages.
Requirement for Restriction Election dated Aug. 2, 2012 from U.S. Appl. No. 12/951,977, 7 pages.
Response filed Aug. 13, 2012 to the Requirement for Restriction Election dated Aug. 2, 2012 from U.S. Appl. No. 12/951,977, 6 pages.
Non-Final Office Action dated Sep. 4, 2012 from U.S. Appl. No. 12/951,977, 10 pages.
Response filed Nov. 29, 2012 to the Non-Final Office Action dated Sep. 4, 2012 from U.S. Appl. No. 12/951,977, 12 pages.
Final Office Action dated Dec. 17, 2012 from U.S. Appl. No. 12/951,977, 19 pages.
Response filed Apr. 17, 2013 to the Final Office Action dated Dec. 17, 2012 from U.S. Appl. No. 12/951,977, 15 pages.
Notice of Allowance dated Apr. 9, 2014 from U.S. Appl. No. 12/951,977, 12 pages.

(56) References Cited

OTHER PUBLICATIONS

Notice of Allowance dated May 21, 2014 from U.S. Appl. No. 12/951,977, 9 pages.
Notice of Allowance dated Sep. 5, 2014 from U.S. Appl. No. 12/951,977, 7 pages.
Notice of Allowance dated Dec. 24, 2014 from U.S. Appl. No. 12/951,977, 7 pages.
Notice of Allowance dated Apr. 15, 2015 from U.S. Appl. No. 12/951,977, 8 pages.
Non-Final Office Action dated Jun. 21, 2012 from U.S. Appl. No. 12/973,399, 20 pages.
Response filed Aug. 27, 2012 to the Non-Final Office Action dated Jun. 21, 2012 from U.S. Appl. No. 12/973,399, 18 pages.
Final Office Action dated Oct. 3, 2012 from U.S. Appl. No. 12/973,399, 25 pages.
Response filed Jan. 23, 2013 to the Final Office Action dated Oct. 3, 2012 from U.S. Appl. No. 12/973,399, 16 pages.
Non-Final Office Action dated Jul. 3, 2014 from U.S. Appl. No. 12/973,399, 26 pages.
U.S. Appl. No. 62/023,785 titled "Energy Routing Within a Server Installation" filed Jul. 11, 2014 by Inventors Liu et al., 32 pages.
International Search Report and Written Opinion dated Nov. 23, 2015 from PCT Patent Application No. PCT/US2015/039463, 16 pages.
"ASG-Workload Optimization Suite for Comprehensive Workload Analysis andForecasting", Allen Systems Group, Inc., 2009, 1 page.
"Carbon Dioxide Emissions from the Generation of Electric Power in the United States", Department of Energy and Environmental Protection Agency, Jul. 2000, retrieved at<<http://www.eia.gov/cneaf/electricity/page/co2_report/co2report.html>>, 21 pages.
"Carbon Tax Center", retrieved at <<www.carbontax.org>>, Aug. 5, 2010, 7 pages.
"Consultants: How and Why Pay Per Performance Works (Part 2—continuation from last post)", Weblog posting published Apr. 19, 2010, retrieved at <<http://bizrelationships.wordpress.com/2010/04/19/consultants-how-and-why-pay-perperformance-works-part-2-continuation-from-last-post>>, 5 pages.
"HP Power Capping and HP Dynamic Power Capping for ProLiant servers", retrieved at <<http://h20565.www2.hpe.com/hpsc/doc/public/display?docId=emr_na-c01549455-5&lang=en-us&cc=us>>, Jan. 23, 2014, 25 pages.
"Leading the Evolution of the Data Center", Brocade Communications Systems, Inc., San Jose, CA, 2008, 8 pages.
"Managing Energy Efficiency in the Data Center," EMC Corporation, Hopkinton, MA, 2008, 6 pages.
"PlateSpin Recon", retrieved at <<http://www.novell.com/products/recon/consolidation_ratios.html>> on Mar. 13, 2011, Novell, Inc., 2009, 3 pages.
"Power Management in the Cisco Unified Computing System: An Integrated Approach", White Paper of Cisco, retrieved at <<http://www.cisco.com/c/en/us/solutions/collateral/data-center-virtualization/unified-computing/white_paper_c11-627731.html>> on Aug. 7, 2014, 17 pages.
"Reducing Data Center Power and Energy Consumption: Saving Money and "Going Green"", retrieved at <<http://www.gtsi.com/cms/documents/white-papers/green-it.pdf>>, Jan. 2010, 16 pages.
"Server Power Management Comparison: Dell Openmanage Power Center and HP Insight Control", published Sep. 2012, retrieved at<<http://en.community.dell.com/cfs-file.ashx/_key/telligent-evolution-components-attachments/13-4491-00-00-20-22-78-75/Dell-Open-Manage-Power-Center-vs-HP-Insight-Control.pdf>>, 25 pages.
"Smart Grids Arrive Step by Step", retrieved Jul. 25, 2014, available at: <<http://www.eue24.net/pi/index.php?StoryID=253&articleID=238316>>, 4 pages.
"Solar chimney", Wikipedia, the free encyclopedia, captured by the Internet archive from <<www.http://en.wikipedia.org/wiki/Solar_chimney>> on Feb. 7, 2009, 5 pages.
"The Path to a Green Data Center", Hitachi Data Systems and Brocade, Joint Solution Brief, Brocade Communications Systems, Inc., San Jose, CA, 2007, 8 pages.
"What is an SLA?", Sensible Cloud, retrieved at <<http://www.sensiblecloud.com/2010/11/what-is-sla/>> on Mar. 24, 2011, 5 pages.
"Windows Azure Platform", retrieved at <<http://www.microsoft.com/windowsazure/>> on Aug. 5, 2010, 2 pages.
"Zeus launches data center load balancing solution", Jun. 28, 2007, retrieved at <<http://www.continuitycentral.com/news03343.htm>>, Continuity Central, 1 page.
"About Vibes Interactive", Vibes Interactive LLC, 2010, retrieved at <<http://www.vibesinteractive.com/about_us.html>> on Mar. 24, 2011, 1 page.
"Tout+Interactive", Mar. 22, 2011, retrieved at <<http://toutinteractive.com/>>, 8 pages.
Ardagna et al., "SLA Based Profit Optimization in Multi-Tier Systems", Proceedings of the Fourth IEEE International Symposium on Network Computing and Applications, Jul. 27-29, 2005, 4 pages.
Bansal et al., "A Primal-Dual Randomized Algorithm for Weighted Paging", retrieved at <<http://www.cs.technion.ac.il/~nivb/papers/weighted-paging.pdf>>, 2007, 11 pages.
Bansal et al., "Randomized Competitive Algorithms for Generalized Caching", Proceedings of the 40th Annual ACM Symposium on Theory of Computing, May 17-20, 2008, pp. 235-244, 10 pages.
Bansal et al., "Towards the Randomized k-Server Conjecture: A Primal-Dual Approach", Proceedings of the 21st Annual ACM-SIAM Symposium on Discrete Algorithms, 2010, Society for Industrial and Applied Mathematics, Philadelphia, PA, 24 pages.
Bansal et al., "Metrical Task Systems and the k-Server Problem on HSTs", Proceedings of the 37th International colloquium on Automata, Languages and Programming, 2010, 12 pages.
Bartal et al., "A polylog (n)-competitive algorithm for metrical task systems", Proceedings of the 29th Annual ACM Symposium on Theory of Computing, 1997, New York, NY, pp. 711-719, 9 pages.
Battles et al., "Reducing Data Center Power Consumption through Efficient Storage", Network Appliance, Inc., Sunnyvale, CA, WP-7010-0207, Feb. 2007, 9 pages.
Belady, Christian, "In the data center, power and cooling costs more than the it equipment it supports", Electronic cooling, Feb. 2007, 6 pages.
Beloglazov et al., "Energy Efficient Resource Management in Virtualized Cloud Data Centers", Proceedings of the Tenth IEEE/ACM International Conference on Cluster, Cloud, and Grid Computing, May 17-20, 2010, 6 pages.
Benini et al., "Policy Optimization for Dynamic Power Management", IEEE Transactions on Computer-Aided Design of Integrated Circuits and Systems, vol. 18, No. 6, Jun. 1999, pp. 813-833, 21 pages.
Bianchini et al., "Power and Energy Management for Server Systems", from Journal Computer archive, vol. 37, Issue 11, Nov. 2004, 11 pages.
Bodik et al., "Response-Time Modeling for Resource Allocation and Energy-Informed SLA's," Proceedings of the Workshop on Statistical Learning Techniques for Solving Systems Problems (MS Sys'07), Dec. 8, 2007, 3 pages.
Bonvin et al., "Autonomic SLA-driven Provisioning for Cloud Applications", 11th IEEE/ACM International Symposium on Cluster, Cloud and Grid Computing (CCGrid), May 23-26, 2011, 10 pages.
Borenstein et al. "Dynamic Pricing, Advanced Metering, and Demand Response in Electricity Markets", University of California Energy Institute, UC Berkeley, Oct. 31, 2002, 102 pages.
Borgs et al., "Optimal Mechanisms for Perishable Goods With Variable Supply and Demand", Aug. 11, 2010, 8 pages.
Borodin et al., "An Optimal On-Line Algorithm for Metrical Task System", Journal of the ACM, vol. 39, No. 4, Oct. 1992, pp. 745-763, 19 pages.
Borodin et al., "Online Computation and Competitive Analysis", Table of Contents, Cambridge University Press, New York, NY, 1998, 6 pages.

(56) References Cited

OTHER PUBLICATIONS

Buchbinder et al., "The Design of Competitive Online Algorithms Via a Primal-dual Approach", Foundations and Trends in Theoretical Computer Science, vol. 3, Issue 2-3, 2007, 174 pages.
Buchbinder et al., "Online Job-Migration for Reducing the Electricity Bill in the Cloud", Lecture Notes in Computer Science, Networking 2011 Proceedings of the 10thInternational IFIP TC 6 Conference on Networking, vol. 6640, Part I, Mar. 13, 2011, 12 pages.
Butler, Declan, "France unveils carbon tax", Nature News, Sep. 15, 2009, 4 pages.
Buyya et al., "Cloudbus Toolkit for Market-Oriented Cloud Computing", Proceedings of the 1st International Conference on Cloud Computing, Oct. 11, 2009, pp. 24-44, 21 pages.
Chase et al., "Managing Energy and Server Resources in Hosting Centers", Proceedings of the Eighteenth ACM Symposium on Operating Systems Principles, 2001,pp. 103-116, 14 pages.
Chatwin, Richard E., "Optimal Dynamic Pricing of Perishable Products with Stochastic Demand and a Finite Set of Prices", European Journal of Operational Research 125, Aug. 1, 1997, pp. 149-174, 26 pages.
Chaver et al., "Energy-Aware Fetch Mechanism: Trace Cache and BTB Customization", Proceedings of the International Symposium on Low Power Electronics and Design, Aug. 8-10, 2005, pp. 42-47, 6 pages.
Chen et al., "Dynamic Server Power Capping for Enabling Data Center Participation in Power Markets", Proceedings of the International Conference on Computer-Aided Design, Nov. 18, 2013, 8 pages.
Chen et al., "Energy-Aware Server Provisioning and Load Dispatching for Connection-Intensive Internet Services" Proceedings of the 5th USENIX Symposium on Networked Systems Design and Implementation, 2008, 14 pages.
Cho et al., "Strategic Consumer Response to Dynamic Pricing of Perishable Products," International Series in Operations Research and Management Science, vol. 131, Aug. 2008, 36 pages.
Clark et al., "Live Migration of Virtual Machines", Proceedings of the Second ACM/USENIX Symposium on Networked Systems Design and Implementation, May 2005, 14 pages.
Dasu et al., "Dynamic Pricing When Consumers are Strategic: Analysis of a Posted Pricing Scheme", European Journal of Operational Research, vol. 204, Issue 3, 2010, pp. 1-23, 23 pages.
Dimosthenis et al., "A Real-time Service Oriented Infrastructure", GSTF Journal on Computing, Feb. 2011, pp. 196-204, 18 pages.
Dunn, David, "Data Center Energy Efficiency Through BCM", Industry Perspectives, Jan. 22, 2010, 7 pages.
Fan et al., "Power Provisioning for a Warehouse-sized Computer", Proceedings of the ACM International Symposium on Computer Architecture, Jun. 2007, 11 pages.
Felter et al., "A Performance-Conserving Approach for Reducing Peak Power Consumption in Server Systems", ICS'05, Boston, MA, Jun. 20-22, 2005, 10 pages.
Fiat et al., "Better Algorithms for Unfair Metrical Task Systems and Applications", Proceedings of the 32nd Annual ACM Symposium on Theory of Computing, 2000, New York, NY, pp. 725-734, 20 pages.
Giannakoudis et al., "Optimum Design and Operation Under Uncertainty of Power Systems Using Renewable Energy Sources and Hydrogen Storage", International Journal of Hydrogen Energy, vol. 35, Issue 3, Feb. 2010, pp. 872-891, 20 pages.
Gmach et al., "Capacity Planning and Power Management to Exploit Sustainable Energy", Proceedings of the 2010 International Conference on Network and Service Management, Oct. 25-29, 2010, pp. 96-103, 8 pages.
Grossman, Robert L., "The Case for Cloud Computing", IT Professionalism, vol. 11, No. 2, Mar. 21, 2009, pp. 23-27, 5 pages.
Harrison, Andrew, "Symantec Energy Efficient Date Center Solutions", retrieved from <<http://m.softchoice.com/filed/pdf/about/sustain-enable/Symantec.energy_efficient_data_center_solutions_pdf>>, Symantec Corporation, Jan. 12, 2008, 15 pages.
Iranli et al., "System-Level Power Management: An Overview", The VLSI Handbook Second Edition, Dec. 2006, 22 pages.
Jain et al., "SLA-Integrated Pricing Models for Cloud Computing", Microsoft Research, Oct. 18, 2010, 5 pages.
Jain, Navendu, "An Optimization Framework for Dynamic Client-Server Partitioning in the IMA application", Apr. 16, 2010, 3 pages.
Request for Examination with Voluntary Amendment filed Dec. 30, 2014 from Korean Patent Application No. 10-2011-7019493, 17 pages.
Response filed Feb. 16, 2016 to the Office Action dated Dec. 16, 2015 from Korea Patent Application No. 10-2011-7019493, 23 pages.
Notice of Allowance dated Feb. 22, 2016 from Korea Patent Application No. 10-2011-7019493, 6 pages.
Non-Final Office Action dated Apr. 3, 2013 from U.S. Appl. No. 12/781,445, 11 pages.
Response filed Aug. 2, 2013 to the Non-Final Office Action dated Apr. 3, 2013 from U.S. Appl. No. 12/781,445, 14 pages.
Non-Final Office Action dated Dec. 3, 2013 from U.S. Appl. No. 12/781,445, 16 pages.
Response filed Apr. 1, 2014 to the Non-Final Office Action dated Dec. 3, 2013 from U.S. Appl. No. 12/781,445, 12 pages.
Notice of Allowance dated Aug. 15, 2014 from U.S. Appl. No. 12/913,763, 8 pages.
Final Office Action dated May 5, 2014 from U.S. Appl. No. 12/781,445, 12 pages.
Response filed Sep. 15, 2014 to the Final Office Action dated May 5, 2014 from U.S. Appl. No. 12/781,445, 10 pages.
Non-Final Office Action dated Sep. 23, 2014 from U.S. Appl. No. 12/781,445, 12 pages.
International Search Report and Written Opinion dated Dec. 23, 2011 from PCT Patent Application No. PCT/US2011/036364, 8 pages.
International Preliminary Report on Patentability dated Nov. 20, 2012 from PCT Patent Application No. PCT/US2011/036364, 4 pages.
First Office Action dated Sep. 16, 2014 from Chinese Patent Application No. 201180024779.5, 12 pages
Non-Final Office Action dated Nov. 21, 2012 from U.S. Appl. No. 12/779,059, 26 pages.
Response filed Feb. 15, 2013 to the Non-Final Office Action dated Nov. 21, 2012 from U.S. Appl. No. 12/779,059, 9 pages.
Final Office Action dated Apr. 11, 2013 from U.S. Appl. No. 12/779,059, 31 pages.
Response filed Aug. 10, 2013 to the Final Office Action dated Apr. 11, 2013 from U.S. Appl. No. 12/779,059, 11 pages.
Non-Final Office Action dated Dec. 5, 2014 from U.S. Appl. No. 12/779,059, 22 pages.
Response filed Apr. 6, 2015 to the Non-Final Office Action dated Dec. 5, 2014 from U.S. Appl. No. 12/779,059, 13 pages.
Notice of Allowance and Examiner-Initiated Interview Summary dated May 20, 2015 from U.S. Appl. No. 12/779,059, 76 pages.
Notice of Allowance dated Sep. 24, 2015 from U.S. Appl. No. 12/779,059, 30 pages.
Requirement for Restriction Election dated Jun. 7, 2012 from U.S. Appl. No. 12/913,763, 10 pages.
Response filed Jun. 27, 2012 to the Requirement for Restriction Election dated Jun. 7, 2012 from U.S. Appl. No. 12/913,763, 10 pages.
Non-Final Office Action dated Dec. 31, 2012 from U.S. Appl. No. 12/913,763, 15 pages.
Response filed Apr. 30, 2013 to the Non-Final Office Action dated Dec. 31, 2012 from U.S. Appl. No. 12/913,763, 16 pages.
Notice of Allowance dated Aug. 23, 2013 from U.S. Appl. No. 12/913,763, 9 pages.
Notice of Allowance dated Mar. 11, 2014 from U.S. Appl. No. 12/913,763, 22 pages.
Notice of Allowance dated Jul. 7, 2014 from U.S. Appl. No. 12/913,763, 8 pages.

(56) References Cited

OTHER PUBLICATIONS

Zhang et al."Cloud Computing: State-of-the-Art and Research Challenges", Journal of Internet Services and Applications, vol. 1(1), Apr. 20, 2010, pp. 7-18, 12 pages.
U.S. Appl. No. 62/023,772 titled "Power Management of Server Installations" filed Jul. 11, 2014 by Inventors Liu et al., 27 pages.
International Search Report and Written Opinion dated Oct. 23, 2015 from PCT Patent Application No. PCT/US2015/039459, 13 pages.
Response and Demand filed Dec. 28, 2015 to the International Search Report and Written Opinion dated Oct. 23, 2015 from PCT Patent Application No. PCT/US2015/039459, 8 pages.
Second Written Opinion dated Feb. 8, 2016 from PCT Patent Application No. PCT/US2015/039459, 4 pages.
International Preliminary Report on Patentability dated Jun. 6, 2016 from PCT Patent Application No. PCT/US2015/039459, 8 pages.
Non-Final Office Action dated Nov. 19, 2013 from U.S. Appl. No. 13/251,777, 14 pages.
Response filed Feb. 19, 2014 to the Non-Final Office Action dated Nov. 19, 2013 from U.S. Appl. No. 13/251,777, 12 pages.
Final Office Action dated Jul. 15, 2014 from U.S. Appl. No. 13/251,777, 10 pages.
Response filed Oct. 15, 2014 to the Final Office Action dated Jul. 15, 2014 from U.S. Appl. No. 13/251,777, 10 pages.
Notice of Allowance dated Nov. 7, 2014 from U.S. Appl. No. 13/251,777, 5 pages.
Non-Final Office Action dated May 13, 2016 from U.S. Appl. No. 14/679,699, 11 pages.
Response filed Jul. 14, 2016 to the Non-Final Office Action dated May 13, 2016 from U.S. Appl. No. 14/679,699, 9 pages.
Notice of Allowance dated Aug. 10, 2016 from U.S. Appl. No. 14/679,699, 14 pages.
Non-Final Office Action dated Oct. 7, 2011 from U.S. Appl. No. 12/492,385, 14 pages.
Response filed Jan. 6, 2012 to the Non-Final Office Action dated Oct. 7, 2011 from U.S. Appl. No. 12/492,385, 15 pages.
Final Office Action dated Mar. 15, 2012 from U.S. Appl. No. 12/492,385, 16 pages.
Response filed Jul. 16, 2012 to the Final Office Action dated Mar. 15, 2012 from U.S. Appl. No. 12/492,385, 17 pages.
Notice of Allowance and Examiner-Initiated Interview Summary dated Feb. 19, 2013 from U.S. Appl. No. 12/492,385, 14 pages.
Notice of Allowance dated Jul. 18, 2013 from U.S. Appl. No. 12/492,385, 6 pages.
Notice of Allowance dated Mar. 31, 2014 from U.S. Appl. No. 12/492,385, 18 pages.
Supplemental Amendment dated Jun. 6, 2014 from U.S. Appl. No. 12/492,385, 8 pages.
Notice of Allowance dated Jun. 24, 2014 from U.S. Appl. No. 12/492,385, 8 pages.
Notice of Allowance dated Jul. 30, 2014 from U.S. Appl. No. 12/492,385, 7 pages.
Non-Final Office Action dated Aug. 1, 2011 from U.S. Appl. No. 12/391,188, 12 pages.
Applicant-Initiated Interview Summary dated Oct. 31, 2011 from U.S. Appl. No. 12/391,188, 3 pages.
Response filed Nov. 16, 2011 to the Non-Final Office Action dated Aug. 1, 2011 from U.S. Appl. No. 12/391,188, 11 pages.
Final Office Action dated Dec. 19, 2011 from U.S. Appl. No. 12/391,188, 17 pages.
Applicant-Initiated Interview Summary dated Feb. 22, 2012 from U.S. Appl. No. 12/391,188, 3 pages.
Response filed Mar. 19, 2012 to the Final Office Action dated Dec. 19, 2011 from U.S. Appl. No. 12/391,188, 11 pages.
Jiang et al., "Enabling Autonomic Power-Aware Management of Instrumented Data Centers", Proceedings of the 2009 IEEE International Symposium on Parallel & Distributed Processing, 2009, 8 pages.
Kahn, Chris, "As power demand soars from hot weather, grid holds up so far", Jul. 7, 2010, Associated Press, 1 page.

Kant, Krishna, "Data Center Evolution: A Tutorial on State of the Art, Issues, and Challenges", Computer Networks, vol. 53, Issue 17, Dec. 3, 2009, pp. 2939-2965, 27 pages.
Kant, Krishna, "Distributed Energy Adaptive Computing", Proceedings of the IEEE International Conference on Communications, May 2010, 5 pages.
Kant, Krishna, "Power Control of High Speed Network Interconnects in Data Centers", IEEE INFOCOM Workshops, Apr. 2009, 6 pages.
Karve et al., "Dynamic Placement for Clustered Web Applications", Proceedings of the Fifteenth International World Wide Web Conference, May 22-26, 2006, 10 pages.
Le et al., "Managing the Cost, Energy Consumption, and Carbon Footprint of Internet Services," SIGMETRICS'10, Jun. 14-18, 2010, 2 pages.
Levin et al., "Dynamic Pricing in the Presence of Strategic Consumers and Oligopolistic Competition", Management Science, vol. 55, No. 1, Jan. 2009, 37 pages.
Levin et al., "Optimal Dynamic Pricing of Perishable Items by a Monopolist Facing Strategic Consumers", Production and Operations Management, 2009, 53 pages.
Li et al., "Load Balancing for Multi-tiered Database Systems through Autonomic Placement of Materialized Views", Proceedings of the 22nd International Conference on Data Engineering (ICDE 2006), 2006, 1 page.
Lim et al., "Power Budgeting for Virtualized Data Centers", Proceedings of the 2011 USENIX Annual Technical Conference, (USENIX ATC '11), Jun. 15, 2011, 14 pages.
Liu et al., "GreenCloud: A New Architecture for Green Data Center", Proceedings of the 6th International Conference on Autonomic Computing and Communications Industry Session, Jun. 16, 2009, 10 pages.
McGeehan, Patrick, "Heat Wave Report: 102 Degrees in Central Park", The New York Times, Jul. 6, 2010, 17 pages.
Pauley, Wayne A., "Cloud Provider Transparency: An Empirical Evaluation", published Aug. 19, 2010 in IEEE Security and Privacy, vol. 8, No. 6, Nov./Dec. 2010, pp. 32-39, 8 pages.
Perry, Michael, "Australian Greens Propose A$23/ton carbon tax", Reuters, Jan. 29, 2010, 2 pages.
Pflueger et al., "Data Center Efficiency in the Scalable Enterprise", Dell Power Solutions, Feb. 2007, pp. 8-14, 7 pages.
Popa et al., "Enabling Security in Cloud Storage SLAs with CloudProof", Microsoft Research Technical Report MSR-TR-2010-46, May 2010, pp. 1-12, 12 pages.
Qureshi et al., "Cutting the Electric Bill for Internet-Scale Systems", Proceedings of the ACM SIGCOMM 2009 Conference on Data Communication, New York, NY, Aug. 17-21, 2009, pp. 123-134, 12 pages.
Rao et al., "Minimizing Electricity Cost: Optimization of Distributed Internet Data Centers in a Multi-Electricity-Market Environment", INFOCOM, 2010, 9 pages.
Rasmussen, Neil, "Implementing Energy Efficient Data Centers", White Paper #114, American Power Conversion, retrieved from<<http://www.apcmedia.com/salestools/NRAN-6LXSHX_R0_EN.pdf>>, 2006, pp. 1-15, 15 pages.
Sleator et al., "Amortized Efficiency of List Update and Paging Rules", Communications of the ACM, vol. 28, Issue 2, Feb. 1985, pp. 202-208, 7 pages.
"Solar updraft tower", Wikipedia the free encyclopedia, archived on Feb. 1, 2009, <<http://web.archive.org/web/20090201144032/http://en.wikipedia.org/wiki/Solar_updraft_tower>>, 6 pages.
Sweeting, Andrew, "Dynamic Pricing Behavior in Perishable Goods Markets: Evidence from Secondary Markets for Major League Baseball Tickets", Duke University, Feb. 2010, pp. 1-65, 65 pages.
Timmer, John, "Renewable energy and the future of the datacenter", Arstechnica.com Business News, May 28, 2008, 2 pages.
Urgaonkar et al., "Dynamic Provisioning of Multi-tier Internet Applications,", Proceedings of the Second International Conference on Automatic Computing, Jun. 13-16, 2005, 12 pages.
USENIX, "Technical Sessions", Proceedings of the Fifth Usenix Symposium on Networked Systems Design and Implementation, Apr. 16-18, 2008, 4 pages.

(56) References Cited

OTHER PUBLICATIONS

Vazirani, Vijay, "Approximation Algorithms", Springer, 2001, 396 pages.
Verma et al., "BrownMap: Enforcing Power Budget in Shared Data Centers", Middleware 2010, Springer Berlin Heidelberg, 2010, pp. 42-63, 22 pages.
Wang et al., "Feedback Control Algorithms for Power Management of Servers", Proceedings of the Third International Workshop on Feedback Control Implementation and Design in Computing Systems and Networks, Jun. 2008, 6 pages.
Wang et al., "Markdown Money Contracts for Perishable Goods with Clearance Pricing", European Journal of Operational Research, vol. 196, 2009, pp. 1113-1122, 10 pages.
International Preliminary Report on Patentability dated Jan. 26, 2017 from PCT Patent Application No. PCT/US2015/039463, 9 pages.
Non-Final Office Action dated Apr. 10, 2017 from U.S. Appl. No. 14/674,821, 91 pages.
Response filed Jun. 5, 2017 to the Non-Final Office Action dated Mar. 10, 2017 from U.S. Appl. No. 14/464,650, 10 pages.
Restriction Requirement dated Sep. 7, 2017 from U.S. Appl. No. 14/673,829, 6 pages.
Amendment filed Jun. 30, 2017 from Chinese Patent Application No. 201580037843.1, 13 pages.
Response filed Aug. 2, 2017 to the Communication dated Feb. 17, 2017 from European Patent Application No. 15739732.4, 8 pages.
Response filed Jul. 21, 2017 to the Communication Pursuant to Rules 161(1) and 162 EPC dated Feb. 17, 2017 from European Patent Application No. 15741442.6, 8 pages.
"Amendment Filed in Chinese Patent Application No. 201580048797.5", Filed Date: Sep. 7, 2017, 16 Pages.
"Amendment Filed in Chinese Patent Application No. 201580044786.X", Filed Date: Sep. 21, 2017, 12 Pages.
Notice of Allowance dated Sep. 20, 2017 from U.S. Appl. No. 14/464,650, 14 pages.
Non-Final Office Action dated Oct. 30, 2017 from U.S. Appl. No. 14/673,829, 15 pages.
Examination Report dated Jan. 2, 2018 from European Patent Application No. 15741442.6, 8 pages.

\* cited by examiner

SERVER INSTALLATION AS A GRID CONDITION SENSOR

PRIORITY

This application is a utility application that claims priority from provisional application 62/023,777 filed Jul. 11, 2014, which is incorporated by reference in its entirety.

BACKGROUND

Electrical utilities, power plant operators, and/or grid operators are faced with certain difficulties when providing electrical power to a broad range of consumers. For example, electrical utilities may rely on energy sources that vary in availability, e.g., available solar power generally varies throughout the day and also with the weather. Likewise, wind power may vary daily and/or seasonally with the weather.

In addition, demand for electrical power does not typically correlate directly to the availability of power from these energy sources. For example, electrical power consumed by households tends to increase in the evening hours due to watching television, cooking, showering, etc., while the availability of solar energy at these times is limited. In addition, large energy consumers such as server installations (e.g., data centers, server farms, etc.) may provide increased demand for electrical power at times when certain energy sources are limited or unavailable for the electrical utility.

In some cases, imbalances on the grid can cause disruptions, such as grid outages. Grid outages can have significant consequences for both utilities and consumers. However, it is difficult to predict grid disruptions, and thus it is difficult for both utilities and consumers to take steps to mitigate the effects of grid disruptions before they occur.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The description generally relates to grid analysis. One example includes a system that includes a hardware processing unit and a hardware storage device storing instructions. The hardware instructions can cause the hardware processor to implement a grid analysis module and an action causing module. The grid analysis module can be configured to obtain first grid condition signals describing first grid conditions detected by a first server installation during a first time period. The first server installation can be connected to a first electrical grid and a previous grid failure event can have occurred on the first electrical grid during the first time period. The grid analysis module can also be configured to use the first grid condition signals to obtain a prediction of a future failure event on a second electrical grid. The action causing module can be configured to cause an adjustment to an energy storage state of an energy storage device or a current generator state of a generator at a second server installation that is connected to the second electrical grid, based on the prediction.

Another example includes a method or technique that can be performed by a computing device. The example includes obtaining first grid condition signals describing first grid conditions detected by a first server installation during a first time period. The first server installation can be connected to a first electrical grid and first previous grid failure events can have occurred on the first electrical grid during the first time period. The example also includes obtaining second grid condition signals describing second grid conditions detected by a second server installation during a second time period. The second server installation can be connected to a second electrical grid and second previous grid failure events can have occurred on the second electrical grid during the second time period. The example can also include performing an analysis of the first grid conditions and the second grid conditions and predicting a likelihood of a future grid failure event based on the analysis.

Another example includes another method or technique that can be performed by a computing device. The example includes obtaining first grid condition signals describing first grid conditions detected by a first server installation during a first time period. The first server installation can be connected to a first electrical grid and first previous grid failure events can have occurred on the first electrical grid during the first time period. The example also includes obtaining second grid condition signals describing second grid conditions detected by a second server installation during a second time period. The second server installation can be connected to a second electrical grid that is geographically remote from the first electrical grid and second previous grid failure events can have occurred on the second electrical grid during the second time period. The example also includes using the first grid condition signals and the second grid condition signals to predict a future grid failure event on the second electrical grid.

BRIEF DESCRIPTION OF THE DRAWINGS

The Detailed Description is described with reference to the accompanying figures. In the figures, the left-most digit(s) of a reference number identifies the figure in which the reference number first appears. The use of similar reference numbers in different instances in the description and the figures may indicate similar or identical items.

DETAILED DESCRIPTION

Overview

Figure 1:
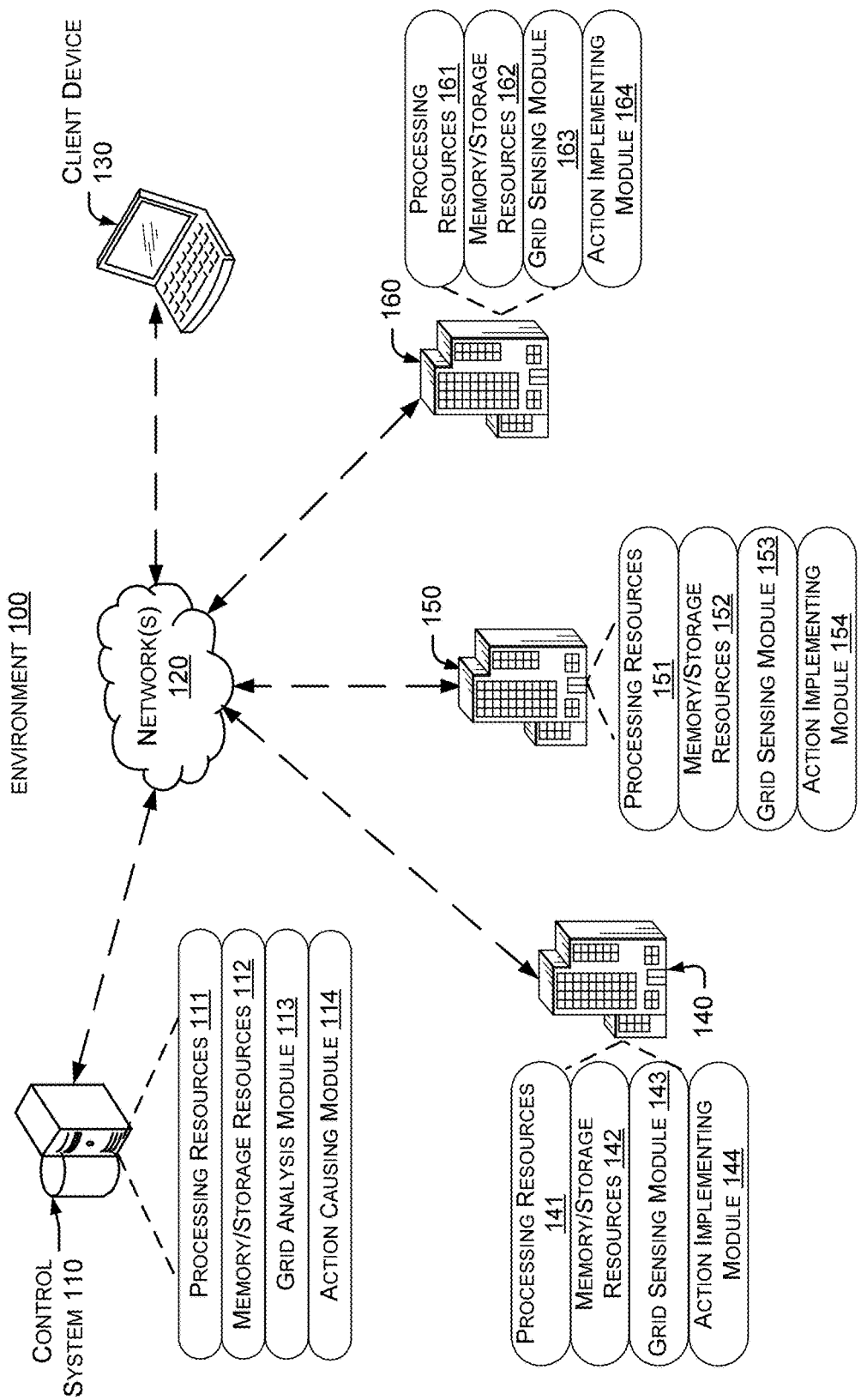
FIG. 1 illustrates an example environment consistent with some implementations of the present concepts.

Grid operators and/or electrical utilities use a variety of different techniques to handle fluctuating conditions on a given grid, such as spinning reserves and peaking power plants. Despite these mechanisms that grid operators have for dealing with grid fluctuations, grid outages and other problems still occur and can be difficult to predict. Because grid outages are difficult to predict, it is also difficult to take preemptive steps to mitigate problems caused by grid failures. For the purposes of this document, the term "grid failure" or "grid failure event" encompasses complete power outages as well as less severe problems such as brownouts.

Some server installations (e.g., data centers, server farms, etc.) use quite a bit of power, and may constitute a relatively high portion of the electrical power provided on a given grid. Because they use substantial amounts of power, these server installations may be connected to high capacity power distribution lines. This, in turn, means that the server installations can sense grid conditions on the power lines that could be more difficult to detect for other power consumers, such as residential power consumers connected to lower-capacity distribution lines.

Server installations may also be connected to very high bandwidth, low latency computer networks, and thus may be able to communicate very quickly. In some cases, grid conditions sensed at one server installation may be used to make a prediction about grid failures at another installation. For example, server installations may be located on different grids that tend to have correlated grid outages. This could be due to various factors, such as weather patterns that tend to move from one server installation to another, due to the underlying grid infrastructure used by the two server installations, etc. Even when grid failures are not correlated between different grids, it is still possible to learn from failures on one grid what type of conditions are likely to indicate future problems on another grid.

Server installations also have several characteristics that enable them to benefit from advance notice of a grid failure. For example, server installations may have local power generation capacity that can be used to either provide supplemental power to the grid or to power servers in the server installation rather than drawing that power from the grid. Server installations can turn on or off their local power generation based on how likely a future grid failure is, e.g., turning on or increasing power output of the local power generation when a grid failure is likely.

In addition, server installations can have local energy storage devices such as batteries (e.g., located in uninterruptable power supplies). Server installations can selectively charge their local energy storage devices under some circumstances, e.g., when a grid failure is predicted to occur soon, so that the server installation can have sufficient stored energy to deal with the grid failure. Likewise, server installations can selectively discharge their local energy storage devices under other circumstances, e.g., when the likelihood of a grid failure in the near future is very low.

In addition, server installations can adjust local deferrable workloads based on the likelihood of a grid failure. For example, a server installation can schedule deferrable workloads earlier than normal when a grid failure is predicted to occur. In addition, power states of servers may be adjusted based on the likelihood of a grid failure, e.g., one or more servers may be placed in a low power state (doing less work) when a grid failure is unlikely in the near future and the servers can be transitioned to higher power utilization states when a grid outage is more likely.

In some disclosed implementations, server installations adaptively adjust some or all of the following based on the predicted likelihood of a grid failure: (1) on-site generation of power, (2) on-site energy storage, and (3) power utilization/workload scheduling by the servers. Because of the flexibility to adjust these three parameters, server installations may be able to address predicted grid failure before they actually occur. This can benefit the server installation by ensuring that workloads are scheduled efficiently, reducing the likelihood of missed deadlines, lost data, unresponsive services, etc.

For the purposes of this document, the term "energy hardware" encompasses devices such as generators, batteries, power supplies, electrical wiring, etc., that exist at a given server installation for the purposes of powering one or more servers. Parameters (1) and (2) mentioned above may be adjusted by taking various "energy hardware actions" such as turning on or off generators, adjusting output of running generators, charging or discharging batteries, etc. Parameter (3) mentioned above can be adjusted by taking various "server actions" such as placing a given server into a low power state, moving workloads from one server to another, throttling or stopping various services on a given server, etc.

Server installations may be able to take actions to mitigate grid failures in a very short amount of time. For example, some computing jobs can be moved to other server installations very quickly, depending on the available bandwidth and latency for transferring any computational state associated with the computing jobs. As another example, some on-site power generators can be fully operational and providing maximal power output within about 10 seconds. As a consequence, the ability to predict a grid failure can still be beneficial to a server installation even if the grid failure is predicted to occur in a very short period of time.

Example Network Scenario

One specific environment in which the disclosed techniques can be performed is shown in FIG. 1, which shows an example environment 100 including a control system 110 connected via a network 120 to a client device 130 and server installations 140, 150, and 160. Generally speaking, the client device may request various services from any of the server installations, which in turn use electrical power to perform computational work on behalf of the client device. The server installations may be connected to different grids that suffer different grid failures at different times. The control system can receive various grid condition signals from the server installations and control the server installations based on the predicted likelihood of grid outages at the respective grids, as discussed more below. Because the server installations and control system may be able to communicate very quickly over network 120, the server installations may be able to react quickly in response to predicted grid outages.

The control system 110 may include a grid analysis module 113 that is configured to receive data, such as grid condition signals, from various sources such as server installations 140, 150, and 160. The grid analysis module can analyze the data to predict grid outages or other problems. The control system may also include an action causing module 114 that is configured to use the predictions from the grid analysis module to determine different power hardware and server actions for the individual server installations to apply. The action causing module may also be configured to transmit various instructions to the individual server installations to cause the server installations to perform these power hardware actions and/or server actions.

The server installations can include respective grid sensing modules 143, 153, and/or 163. Generally, the grid sensing modules can sense various grid condition signals such as voltage, power factor, frequency, electrical outages or other grid failures, etc. These signals can be provided to the grid analysis module 113 for analysis. In some cases, the grid sensing module can perform some transformations on the grid condition signals, e.g., using analog instrumentation to sense the signals and transforming the signals into a digital representation that is sent to the grid analysis module. For example, integrated circuits can be used to sense voltage, frequency, and/or power and digitize the sensed values for analysis by the grid analysis module.

Using the grid condition signals received from the various server installations, the grid analysis module 113 can perform grid analysis functionality such as predicting future power outages or other problems on a given grid. In some cases, the grid analysis module identifies correlations of grid outages between different server installations located on different grids. In other implementations, the grid analysis module identifies certain conditions that occur with grid outages detected by various server installations and predicts whether other grid outages will occur on other grids based on existence of these conditions at the other grids.

Action causing module 114 can use a given prediction to control the energy hardware at any of the server installations. Generally, the action causing module can send instructions over network 120 to a given server installation. Each server installation can have a respective action implementing module 144, 154, and 164 that directly controls the local energy hardware and/or servers in that server installation based on the received instructions. For example, the action causing module may send instructions that cause any of the action implementing modules to use locally-sourced power from local energy storage devices, generators, or other energy sources instead of obtaining power from a power generation facility or grid. Likewise, the action causing module can provide instructions for controlling one or more switches at a server installation to cause power to flow to/from the server installation to an electrical grid. In addition, the action causing module can send instructions that cause the action implementing modules at any of the server installations to throttle data processing for certain periods of time in order to reduce total power consumption (e.g., by placing one or more servers in a low power consumption state).

In some cases, the action causing module can perform an analysis of generator state and energy storage state at a given server installation. Based on the analysis as well as the prediction obtained from the grid analysis module 113, the control system 110 can determine various energy hardware actions or server actions to apply at the server installation. These actions can, in turn, cause servers at the server installation to adjust workloads as well as cause the generator state and/or energy storage state to change.

For the purposes of this document, the term "generator state" refers generally to the operational state of a generator. For example, this term can encompass whether a given generator is currently running, whether a given generator is currently warmed up and able to provide electrical power, the amount of power being currently generated by a given generator, etc. This term can also encompass whether the generator is in an "overload state" where the generator is producing greater than its rated capacity of power, as well as how long the generator has been running in the overload state. Some generators are rated to run in overload states for a specified number of hours per year and the number of hours currently used can be a factor in how the control system performs the functionality discussed herein.

For the purposes of this document, the term "energy storage state" refers generally to the operational state of an energy storage device. This term encompasses the current discharge state of an energy storage device, whether the energy storage device is currently being charged or discharged, the rate at which the energy storage device is being charged or discharged, etc. This term also can encompass historical information that may be useful for determining the usable lifetime of an energy storage device. In the case of a battery, the historical information can include the age of the battery, the number of previous discharge cycles, and/or the depth of previous discharge cycles. For some batteries, very deep discharge cycles (e.g., below 10%) can have significant negative impacts on the life of the battery, and the control system can take this into account when performing the functionality discussed herein.

Note that control system 110 is shown in FIG. 1 as located externally from server installations 140, 150, and 160. In further implementations, control system 110 may be collocated with any or all of the server installations. For example, in some cases, each server installation may have an instance of the entire control system located therein and the local instance of the control system may control power usage/generation and servers at the corresponding server installations. In other cases, each server installation may be controlled over network 120 by a single instance of the control system 110. In still further cases, the grid analysis module 113 is located remotely from the server installations and each server installation can have its own action causing module located thereon. In this case, the grid analysis module provides predictions to the individual server installations, the action causing module evaluates local energy hardware state and/or server state, and determines which actions to apply based on the received predictions.

Also, note that control system 110 can include various processing resources 111 and memory/storage resources 112 that can be used to implement grid analysis module 113 and action causing module 114. Likewise, the server installations can include various processing resources 141, 151, and 161 and memory/storage resources 142, 152, and 162. These processing/memory resources can be used to implement the respective grid sensing modules 143, 153, and 163 and the action implementing modules 144, 154, and 164. Additional details regarding processing and memory resources are discussed in more detail below in the section entitled "Device Implementations."

Example Supply-Side Server Installation Scenario

Server installations may be implemented in both supply-side and consumption-side scenarios. Generally speaking, a server installation in a supply-side scenario can be configured to provide electrical power to the grid under some circumstances and to draw power from the grid in other circumstances. A server installation in a consumption-side scenario can be configured to draw power from the grid but may not be able to provide net power to the grid. For the purposes of example, assume server installation 140 is configured in a supply-side scenario and server installations 150 and 160 are configured in consumption-side scenarios, as discussed more below.

Figure 2:
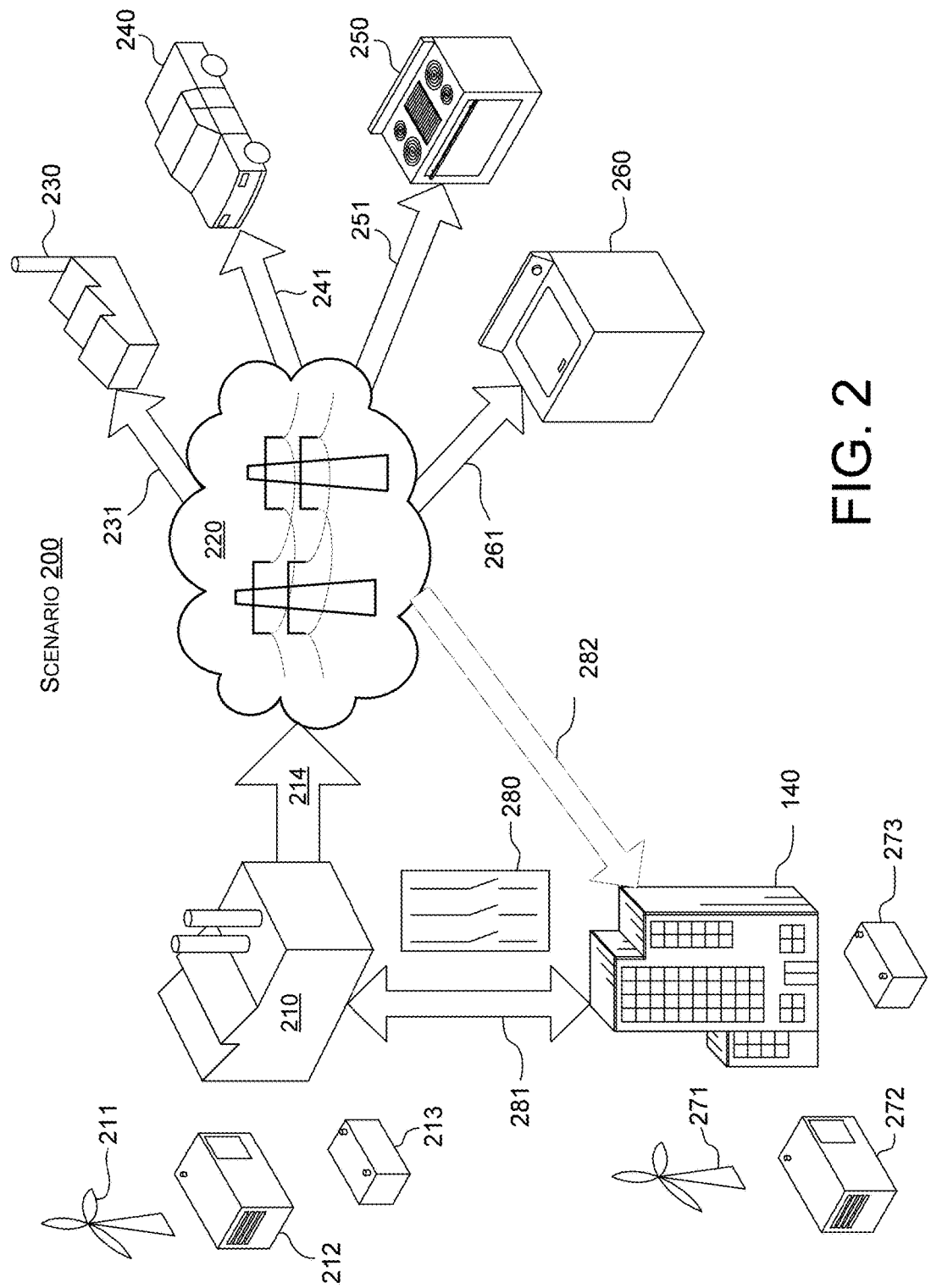
FIGS. 2 and 3 illustrate example scenarios consistent with some implementations of the present concepts.

FIG. 2 illustrates an example scenario 200 with a power generation facility 210 providing electrical power to an electrical grid 220 having electrical consumers 230-260. In the example of FIG. 2, the electrical consumers are shown as a factory 230, electric car 240, electric range 250, and washing machine 260, but those skilled in the art will recognize that any number of different electrically-powered devices may be connected to grid 220. Generally speaking, the power generation facility provides power to the grid and the electrical consumers consume the power, as illustrated by the directionality of arrows 214, 231, 241, 251, and 261, respectively. Note that, in some cases, different entities may manage the power generation facility and the grid (e.g., a power generation facility operator and a grid operator) and in other cases the same entity will manage both the power generation facility and the grid.

FIG. 2 also shows server installation 140 connected to the power generation facility 210 via a switch 280. Switch 280 may allow power to be sent from the power generation facility to the server installation or from the server installation to the power generation facility as shown by bidirectional arrow 281. In some cases, the switch can be an automatic or manual transfer switch. Note that in this example, the power generation facility is shown with corresponding energy sources 211-213, which include renewable energy generators 211 (e.g., wind, solar, hydroelectric), fossil fuel generators 212, and energy storage devices 213. Note that the power generation facility may have one or more main generators as well as other generators for reserve capacity, as discussed more below.

In addition, the server installation 140 may be able to draw power directly from electrical grid 220 as shown by arrow 282. This can allow the server installation 140 to sense conditions on the electrical grid. These conditions can be used to predict various grid failure events on electrical grid 220, as discussed more herein.

For the purposes of this document, the term "energy source" encompasses generators, energy storage devices, or other mechanisms that can be used to obtain energy. The term "generator" can also refer to any power generation mechanism and also includes generators powered by renewable technologies, nuclear technologies, fuel cells, etc. The term "energy storage device" encompasses technologies such as electrochemical batteries, capacitors, mechanical energy storage (e.g., water pumped to a given elevation, compressed air, etc.), thermal storage, or other technologies. In some specific implementations, the energy storage devices are electrochemical batteries provided that can be charged by sources including fossil fuel generators 212, which can be powered by diesel, natural gas, etc. In some cases, batteries or other energy storage devices may be provided in uninterruptible power supplies used to power various servers. Note also that the terms charging and discharging as used herein generally means adding stored energy to or removing stored energy from an energy storage device, and is not limited to merely charging of electrochemical batteries. For example, charging may encompass moving water from a lower elevation to a higher elevation, adding thermal energy to a thermal energy source, etc.

Like the power generation facility 210, the server installation 140 may also have energy sources 271-273 shown as renewable energy generators 271, fossil fuel generators 272, and energy storage devices 273. Note that the power generation facility and server installation do not necessarily have the same energy sources, e.g., in some cases, the power generation facility may lack fossil fuel generators and the server installation may lack renewable energy generators or vice versa, as well as various other combinations of power generating/storage equipment. Furthermore, either the power generation facility and/or server installation may have other energy sources not shown (e.g., nuclear, fuel cells, etc.).

Internally, the server installation 140 may have multiple server racks powered by corresponding power supplies. The power supplies may rectify current provided to the server power supplies from alternating current to direct current. In addition, the server installation may have appropriate internal transformers to reduce voltage produced by the server installation or received from the power generation facility 210 to a level of voltage that is appropriate for the server power supplies. In further implementations discussed more below, the server power supplies may have adjustable impedance so they can be configured to intentionally draw more/less power from the power generation facility.

In some implementations, the switch 280 can be an open transition switch and in other cases can be a closed transition switch. In the open transition case, the switch is opened before power generation at the server installation 140 is connected to the grid 220. This can protect the grid from potential problems caused by being connected to the generators. Generally, a grid operator endeavors to maintain the electrical state of the grid within a specified set of parameters, e.g., within a given voltage range, frequency range, and/or power factor range. By opening the switch before turning on the generators, the server installation 140 can avoid inadvertently causing the electrical state of the grid to fluctuate outside of these specified parameters.

Because the open transition scenario does not connect running generators to the grid 220, this scenario can prevent the server installation 140 from providing net power to the grid. Nevertheless, the server installation can still adjust its load on the grid using the switch 280. For example, switch 180 can include multiple individual switches and each individual switch can be selectively opened/closed so that the grid sees a specified electrical load from the server installation. Generators connected to the closed switches may generally be turned off or otherwise configured not to provide power to the grid, whereas generators connected to the open switches can be used to provide power internally to the server installation or, if not needed, can be turned off or idled. Likewise, servers can be configured into various power consumption states and/or energy storage devices can be charged or discharged to manipulate the electrical load placed on the grid by the server installation.

In the closed transition case, the generators can be connected to the grid 220 when generating power. As a consequence, either net power can flow from the grid to the server installation 140 (as in the open transition case) or net power can flow from the server installation to the grid. However, particularly in the closed transition case, the server installation can inadvertently cause the grid to fluctuate outside of the specified voltage, frequency, and/or power factor parameters mentioned above. Thus, in some cases, the generators can be turned on and the sine waves of power synchronized with the grid before the switch is closed, e.g., using paralleling switchgear to align the phases of the generated power with the grid power. If needed, the local energy storage of the server installation can be utilized to provide power to the local servers during the time the generators are being synchronized with the grid. Note that closed transition implementations may also use multiple switches, where each switch may have a given rated capacity and the number of switches turned on or off can be a function of the amount of net power being drawn from the grid or the amount of net power being provided to the grid.

There are additional subtleties to the closed vs. open transition scenarios mentioned above. In the closed transition scenario, the amount of net power that can be provided to the grid 220 at any given time is a function of the peak power output of the generators (including possibly running them in short-term overload conditions for a fixed number of hours per year) as well as power from energy storage (e.g., discharging batteries). For example, if the generators are capable of generating 100 megawatts and the energy storage devices are capable of providing 120 megawatts (e.g., for a total of 90 seconds at peak discharge rate), then a total of 220 megawatts can be sent to the grid for 90 seconds and thereafter 100 megawatts can still be sent to the grid. In addition, generation and/or energy storage capacity can be split between the grid and the servers, e.g., 70 megawatts to the servers and 150 megawatts to the grid for up to 90 seconds and then 30 megawatts to the grid thereafter, etc.

In the open transition scenario, however, the amount of capacity that can be given back to the grid 220 is a function of the amount of power being drawn by the servers. For example, if the servers are only drawing 10 megawatts but the server installation 140 has the aforementioned 100 megawatt generation capacity and 120 megawatts of power from energy storage, the server installation can only "give back" 10 megawatts of power to the grid because the servers are only drawing 10 megawatts. Thus, the ability of the server installation to help mitigate problems in the grid can be viewed as partly a function of server load.

Note that in either the closed or open transition case, energy storage devices can be selectively charged to create a targeted load on the grid 220. In other words, if the batteries can draw 30 megawatts of power when charging, then in either case an additional 30 megawatts can be drawn from the grid so long as the energy storage devices are not fully charged. In some cases, the amount of power drawn by the batteries when charging may vary with the charge state of the energy storage devices, e.g., they may draw 30 megawatts when almost fully discharged (e.g., 10% charged) and may draw only 10 megawatts when almost fully charged (e.g., 90% charged).

Example Consumption-Side Server Installation Scenario

Figure 3:
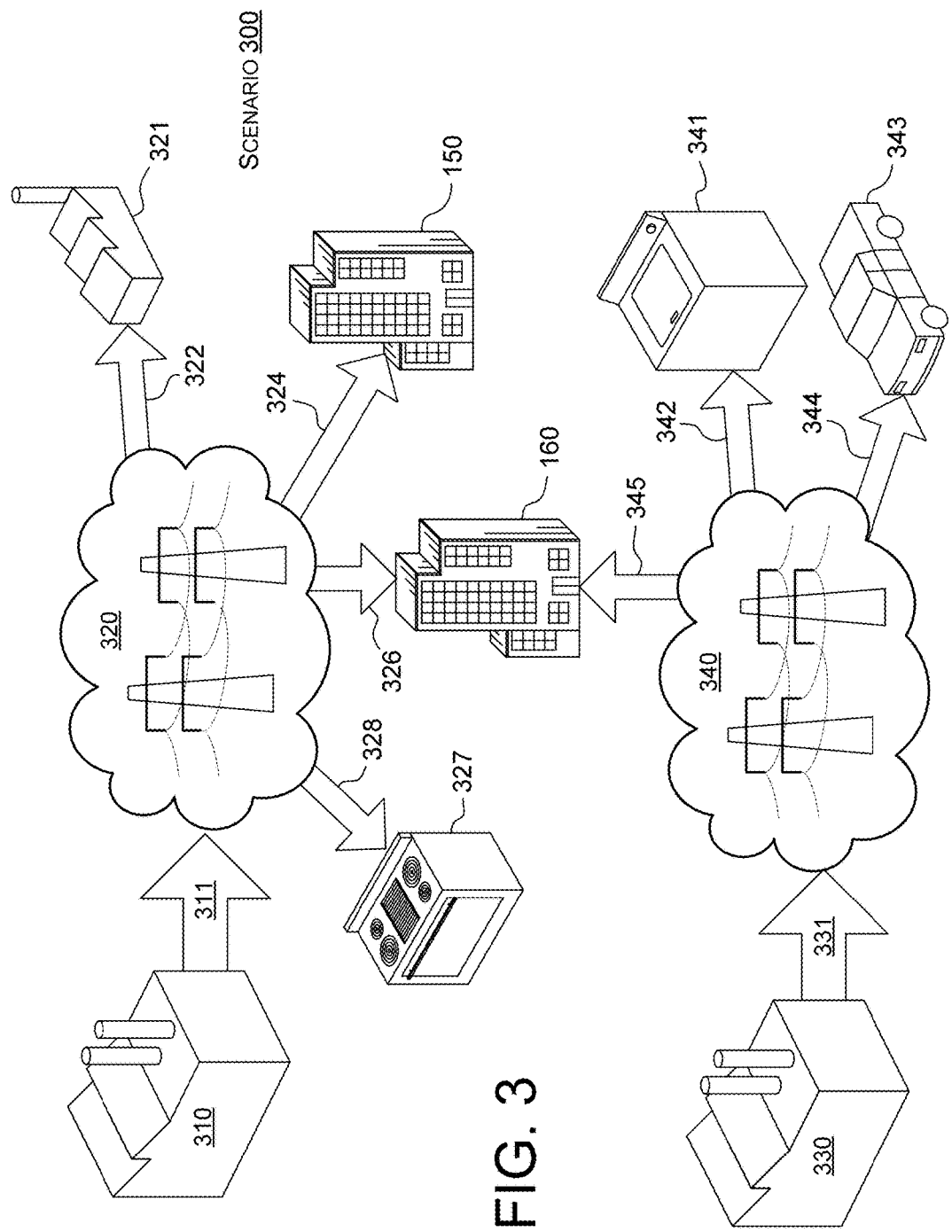

As discussed above, server installations 150 and 160 can be configured in a consumption-side scenario. FIG. 3 illustrates an example scenario 300 with a power generation facility 310 providing electrical power to an electrical grid 320 as shown at arrow 311. In this example, electrical grid 320 provides power to various consumers as shown by arrows 322, 324, 326, and 328. In this example, the consumers include factory 321 and electric range 327, and also server installations 150 and 160. In some cases, the server installations 150 and 160 may lack a closed-transition switch or other mechanism for sending power back to the power generation facility 310. Nevertheless, as discussed more below, power consumption by server installations 150 and 160 may be manipulated and, in some cases, this may provide benefits to an operator of power generation facility 310 and/or electrical grid 320.

Scenario 300 also includes another power generation facility 330 providing electrical power to another electrical grid 340 as shown at arrow 331. In this example, electrical grid 340 provides power to consumers 341 and 343 (illustrated as a washing machine and electric car) as shown by arrows 342 and 344. Note that in this example, server installation 160 is also connected to electrical grid 340 as shown at arrow 345. Thus, server installation 160 can selectively draw power from either electrical grid 320 or electrical grid 340.

Server installations 150 and 160 may have similar energy sources such as those discussed above with respect to server installation 140. In certain examples discussed below, server installation 150 can selectively use power from electrical grid 320 and local batteries and/or generators at server installation 150. Likewise, server installation 160 can selectively use power from electrical grid 320, electrical grid 340, and local batteries and/or generators at server installation 160. In some cases, server installation 150 and/or 160 may operate for periods of time entirely based on local energy sources without receiving power from electrical grids 320 and 340.

Generally, a given server installation can sense conditions on any electrical grid to which it is connected. Thus, in the example of FIG. 3, server installation 150 can sense grid conditions on electrical grid 320, and server installation 160 can sense grid conditions on both electrical grid 320 and electrical grid 340. Likewise, referring back to FIG. 2, server installation 140 can sense grid conditions on electrical grid 220. As discussed further herein, failures occurring on electrical grids 220, 320 and/or 340 can be used to predict future failures on electrical grids 220, 320, electrical grid 340, and/or other electrical grids.

Example Electrical Grid Hierarchy

As used herein, the term "electrical grid" refers to an organizational unit of energy hardware that delivers energy to consumers within a given region. In some cases, the region covered by an electrical can be an entire country, such as the National Grid in Great Britain. Indeed, even larger regions can be considered a single grid, e.g., the proposed European super grid that would cover many different European countries. Another example of a relatively large-scale grid is various interconnections in the United States, e.g., the Western Interconnection, Eastern Interconnection, Alaska Interconnection, Texas Interconnection, etc.

Within a given grid there can exist many smaller organizational units that can also be considered as grids. For example, local utilities within a given U.S. interconnection may be responsible for maintaining/operating individual regional grids located therein. The individual regional grids within a given interconnection can be electrically connected and collectively operate at a specific alternating current frequency. Within a given regional grid there can exist even smaller grids such as "microgrids" that may provide power to individual neighborhoods.

Figure 4:
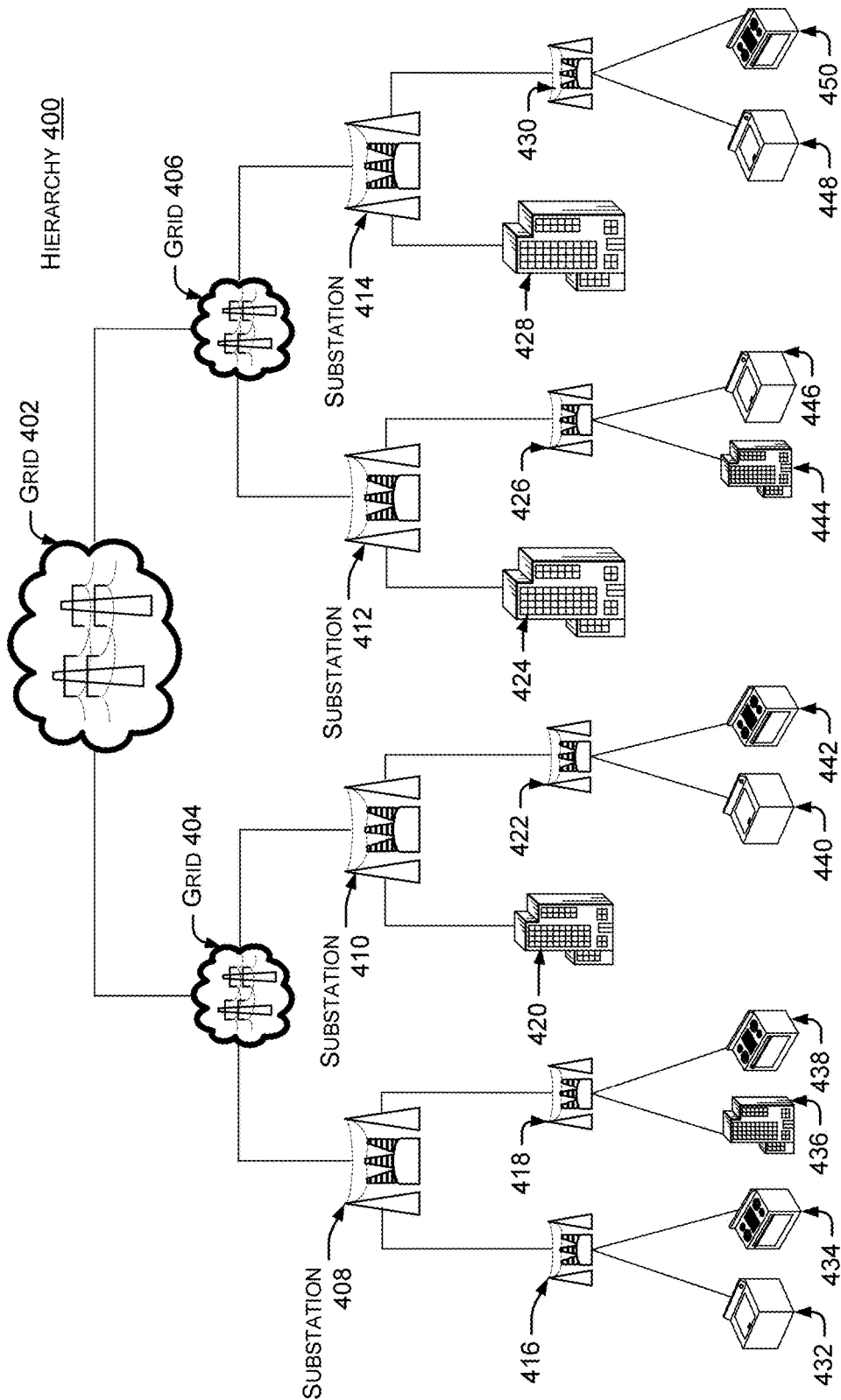
FIG. 4 illustrates an example hierarchy consistent with some implementations of the present concepts.

FIG. 4 illustrates an example electrical grid hierarchy 400 consistent with certain implementations. Note that FIG. 4 is shown for the purposes of illustration and that actual electrical grids are likely to exhibit significantly more complicated relationships than those shown in FIG. 4. Nevertheless, FIG. 4 does illustrate relationships that can occur on electrical grids, as discussed more below.

Electrical grid hierarchy 400 can be viewed as a series of layers, with a top layer having a grid 402. Grid 402 can include other, smaller grids such as grids 404 and 406 in a next-lower layer. Grids 404 and 406 can, in turn, include substations such as substation 408, 410, 412, and 414 in a next-lower layer. Each of substations 408, 410, 412, and 414 can include other substations 416, 418, 422, 426, and 430 and/or server installations 420, 424, and 428 in a next-lower layer. Substations 416, 418, 422, 426, and 430 can include various electrical consumers in the lowest layer, which shows electrical consumers 432, 434, 436, 438, 440, 442, 444, 446, 448, and 450.

The electrical consumers shown in FIG. 4 include server installations 420, 424, 428, 436, and 444. Generally, these server installations can be configured as discussed above with respect to FIGS. 1-3 for any of server installations 140, 150, and/or 160. Moreover, grids 402, 404, and 406 can be similar to grids 220, 320, and/or 340. More generally, the disclosed implementations can be applied for many different configurations of server installations and electrical grids.

Within the hierarchy 400, substations at a higher level can be distribution substations that operate at a relatively higher voltage than other distribution substations at a lower level of the hierarchy. Each substation in a given path in the hierarchy can drop the voltage provided to it by the next higher-level substation. Thus, server installations 420, 424, and 428 can be connected to higher-voltage substations 410, 412, and 414, respectively, whereas server installations 436 and 444 are connected to lower-voltage substations 418 and 426. Regardless of which substation a given server installation is connected to, it can sense power quality on the power lines to the server installation. However, a server installation connected to a higher-voltage substation may be able to sense grid conditions more accurately and/or more quickly than a server installation connected to a lower-voltage substation.

In addition, a relationship between two server installations can be determined using electrical grid hierarchy 400, e.g., by searching for a common ancestor in the hierarchy. For example, server installations 436 and 444 have a relatively distant relationship, as they share only higher-level grid 402. In contrast, server installations 424 and 444 are both served by substation 412 as a common ancestor. Thus, a grid failure event occurring at server installation 444 may be more likely to imply a grid failure event at server installation 424 than would be implied by a grid failure event at server installation 436. More generally, each grid or substation in the hierarchy may provide some degree of electrical isolation between those consumers directly connected to that grid or substation and other consumers.

Also, note that while electrical grid hierarchy 400 shows electrical relationships between the elements shown in FIG. 4, these electrical relationships can also correspond to geographical relationships. For example, grids 404 and 406 could be regional grids for two different regions and grid 402 could be an interconnect grid that includes both of these regions. As another example, grids 404 and 406 could be microgrids serving two different neighborhoods and grid 402 could be a regional grid that serves a region that includes both of these neighborhoods. More generally, grids shown at the same level of the grid hierarchy will typically be geographically remote, although there may be some overlapping areas of coverage. Further, individual server installations may have different relative sizes, e.g., server installations 436 and 444 can be smaller than server installations 420, 424, and 428.

Grid Condition Sensing

A given server installation can sense its own operation conditions, such as workloads, battery charge levels, and generator conditions, as well as predict its own computational and electrical loads as well as energy production in the future. By integrating into the grid, server installations can observe other conditions of the grid, such as the voltage, frequency, and power factor changes on electrical lines connecting the server installation to the grid. In addition, server installations are often connected to fast networks, e.g., to client devices, other server installations, and to management tools such as control system 110. In some implementations, the control system can coordinate observations for server installations at vastly different locations. This can allow the server installations to be used to generate a global view of grid operation conditions, including predicting when and where future grid failure events are likely to occur.

Figure 5:
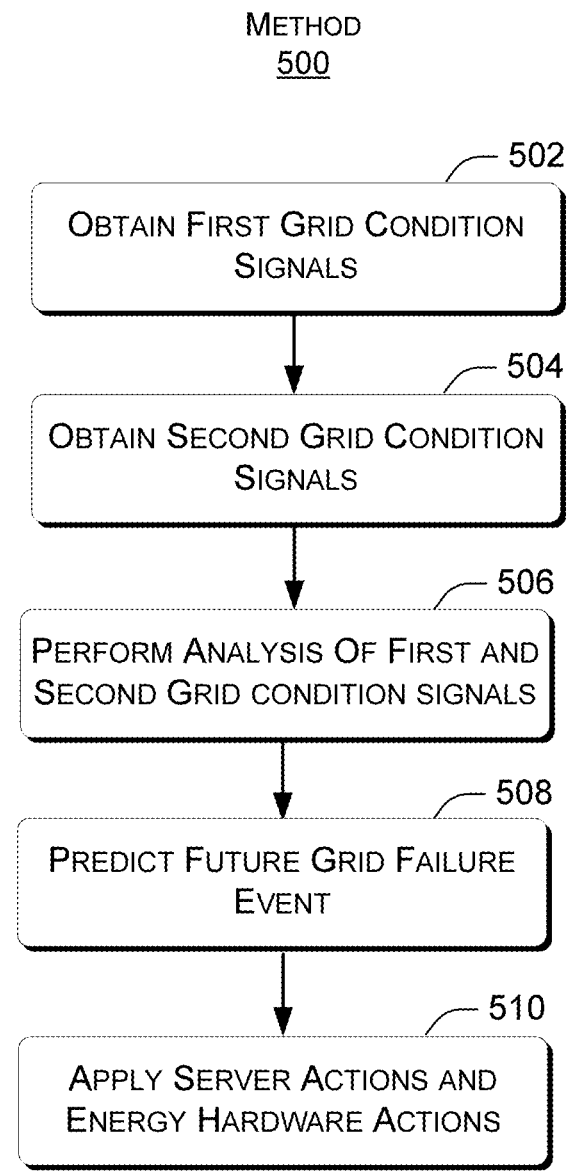
FIG. 5 illustrates an example method or technique consistent with some implementations of the present concepts.

FIG. 5 shows a method 500 that can be performed by control system 110 or another system.

Block 502 of method 500 can include obtaining first grid condition signals. For example, a first server facility connected to a first electrical grid may obtain various grid condition signals by sensing conditions on the first electrical grid. The first grid condition signals can represent many different conditions that can be sensed directly on electrical lines at the first server installations, such as the voltage, frequency, power factor, and/or grid failures on the first electrical grid. In addition, the first grid condition signals can include other information such as the current price of electricity or other indicators of supply and/or demand on the first electrical grid. The first grid condition signals can represent conditions during one or more first time periods, and one or more grid failure events may have occurred on the first electrical grid during the one or more first time periods.

Block 504 can include obtaining second grid condition signals. For example, a second server facility connected to a second electrical grid may obtain various grid condition signals by sensing conditions on the second electrical grid. The second electrical grid can be located in a different geographic area than the first electrical grid. In some cases, both the first electrical grid and the second electrical grid are part of a larger grid. Note the second grid condition signals can represent similar conditions to those discussed above with respect to the first electrical grid and can represent conditions during one or more second time periods when one or more grid failure events occurred on the second electrical grid. Note that both the first grid condition signals and second grid condition signals can also cover times when no grid failures occurred. Also note that the first and second time periods can be the same time periods or different time periods.

Block 506 can include performing an analysis of the first grid condition signals and the second grid condition signals. For example, in some cases, the analysis identifies correlations between grid failure events on the first electrical grid and grid failure events on the second electrical grid. In other cases, the analysis identifies conditions on the first and second electrical grids that tend to lead to grid failure events, without necessarily identifying specific correlations between failure events on specific grids.

Block 508 can include predicting a future grid failure event. For example, block 508 can predict that a future grid failure event is likely to occur on the first electrical grid, the second electrical grid, or another electrical grid. In some cases, current or recent grid condition signals are obtained for many different grids and certain grids can be identified as being at high risk for grid failure events in the near future.

Block 510 can include applying server actions and/or applying energy hardware actions based on the predicted future grid failure events. For example, server installations located on grids likely to experience a failure in the near future can be instructed to turn on local generators, begin charging local batteries, schedule deferrable workloads as soon as possible, send workloads to other server installations (e.g., not located on grids likely to experience near-term failures), etc.

Example Signals

As noted above, grid condition signals can be used for the analysis performed at block 506 of method 500. Different grid conditions can suggest that grid failure events are likely. For example, the price of electricity is influenced by supply and demand and thus a high price can indicate that the grid is strained and likely to suffer a failure event. Both short-term prices (e.g., real-time) and longer-term prices (e.g., day-ahead) for power can be used as grid condition signals consistent with the disclosed implementations.

Other grid condition signals can be sensed directly on electrical lines at the server installation. For example, voltage may tend to decrease on a given grid as demand begins to exceed supply on that grid. Thus, decreased voltage can be one indicia that a failure is likely to occur. The frequency of alternating current on the grid can also help indicate whether a failure event is likely to occur, e.g., the frequency may tend to fall or rise in anticipation of a failure. As another example, power factor can tend to change (become relatively more leading or lagging) in anticipation of a grid failure event. For the purposes of this document, the term "power quality signal" implies any grid condition signal that can be sensed by directly connecting to an electrical line on a grid, and includes voltage signals, frequency signals, and power factor signals.

Over any given interval of time, power quality signals sensed on electrical lines can tend to change. For example, voltage tends to decrease in the presence of a large load on the grid until corrected by the grid operator. As another example, one or more large breakers being tripped could cause voltage to increase until compensatory steps are taken by the grid operator. These fluctuations, taken in isolation, may not imply failures are likely to occur because grid operators do have mechanisms for correcting power quality on the grid. However, if a server installation senses quite a bit of variance in one or more power quality signals over a short period of time, this can imply that the grid operator's compensatory mechanisms are stressed and that a grid failure is likely.

The signals analyzed at block 506 can also include signals other than grid condition signals. For example, some implementations may consider weather signals at a given server installation. For example, current or anticipated weather conditions may suggest that a failure event is likely, e.g., thunderstorms, high winds, cloud cover that may impede photovoltaic power generation, etc. Moreover, weather signals may be considered not just in isolation, but also in conjunction with the other signals discussed herein. For example, high winds in a given area may suggest that some local outages are likely, but if the grid is also experiencing low voltage then this may suggest the grid is stressed and a more serious failure event is likely.

The signals analyzed at block 506 can also include server condition signals. For example, current or anticipated server workloads can, in some cases, indicate that a grid failure may be likely to occur. For example, a server installation may provide a search engine service and the search engine service may detect an unusually high number of weather-related searches in a given area. This can suggest that grid failures in that specific area are likely.

Example Actions

As noted above, the control system 110 can cause a server facility to take various actions based on predicted grid failure events. These actions include controlling local power generation at a server installation, controlling local energy storage at the server installation, controlling server workloads at the server installation, and/or controlling server power states at the server installation. These actions can alter the state of various devices in the server installation, as discussed more below.

Certain actions can alter the generator state at the server installation. For example, as mentioned above, the generator state can indicate whether or not the generators are currently running at the server installation (e.g., fossil fuel generators that are warmed up and currently providing power). The generator state can also indicate a percentage of rated capacity that the generators are running at, e.g., 50 megawatts out of a rated capacity of 100 megawatts, etc. Thus, altering the generator state can include turning on/off a given generator or adjusting the power output of a running generator.

Other actions can alter the energy storage state at the server installation. For example, the energy storage state can indicate a level of discharge of energy storage devices in the server installation. The energy storage state can also include information such as the age of the energy storage devices, number and depth of previous discharge cycles, etc. Thus, altering the energy storage state can include causing the energy storage devices to begin charging, stop charging, changing the rate at which the energy storage devices are being charged or discharged, etc.

As noted above, other actions can alter server state. The server state can include specific power consumption states that may be configurable in the servers, e.g., high power consumption, low power consumption, idle, sleep, powered off, etc. The server state can also include jobs that are running or scheduled to run on a given server. Thus, altering the server state can include both changing the power consumption state and scheduling jobs at different times or on different servers, including sending jobs to other server installations.

In view of the above, method 500 can selectively discharge energy storage devices, selectively turn on/off generators, adaptively adjust workloads performed by one or more servers in the server installation, etc., based on a prediction of a grid failure event. By anticipating possible grid failures, the server installation can realize various benefits such as preventing jobs from being delayed due to grid failure events, preventing data loss, etc. In addition, grid operators may benefit as well because the various actions taken by the server may help prevent grid outages, provide power factor correction, etc.

First Example Algorithm

Figure 6:
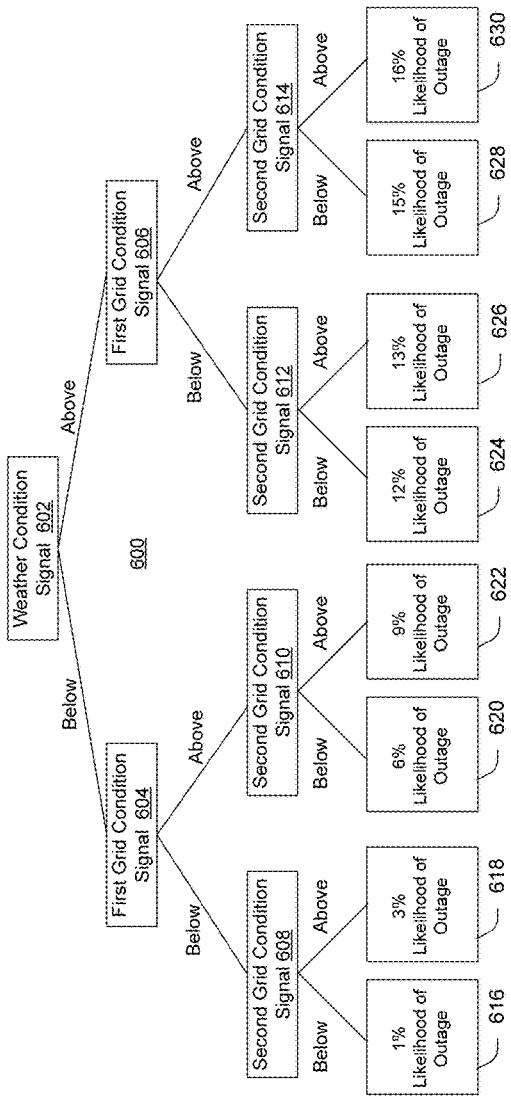
FIGS. 6 and 7 illustrate example algorithms consistent with some implementations of the present concepts.

Block 506 of method 500 can be implemented in many different ways to analyze grid condition signals. One example such technique that can be used is a decision tree algorithm. FIG. 6 illustrates an example decision tree 600 consistent with certain implementations. Decision tree 600 will be discussed in the context of predicting a likelihood of a grid outage. However, decision trees or other algorithms can provide many different outputs related to grid failure probability, e.g., a severity rating on a scale of 1-10, a binary yes/no, predicted failure duration, predicted time of grid failure, etc.

Decision tree 600 starts with a weather condition signal node 602. For example, this node can represent current weather conditions at a given server installation, such as a wind speed. When the wind speed is below a given wind speed threshold, the decision tree goes to the left of node 602 to first grid condition signal node 604. When the wind speed is above the wind speed threshold, the decision tree goes to the right of node 602 to first grid condition signal node 606.

The direction taken from first grid condition signal node 604 and 606 can depend on the first grid condition signal. For the purposes of this example, let the first grid condition signal quantify the extent to which voltage on the grid deviates from a specified grid voltage that a grid operator is trying to maintain. The first grid condition signal thus quantifies the amount that the current grid voltage is above or below the specified grid voltage. When the voltage lag is below a certain voltage threshold (e.g., 0.05%), the decision tree goes to the left of node 604/606, and when the voltage disparity exceeds the voltage threshold, the decision tree goes to the right of these nodes.

The decision tree operates similarly with respect to second grid condition signal nodes 608, 610, 612, and 614. For the purposes of this example, let the second grid condition signal quantify the extent to which power factor deviates from unity on the grid. When the power factor does not deviate more than a specified power factor threshold from unity, the paths to the left out of nodes 608, 610, 612, and 614 are taken to nodes 616, 620, 624, and 628. When the power factor does deviate from unity by more than the power factor threshold, the paths to the right of nodes 608, 610, 612, and 614 are taken to nodes 618, 622, 626, and 630.

Leaf nodes 616-630 represent predicted likelihoods of failure events for specific paths through decision tree 600. Consider leaf node 616, which represents the likelihood of a grid failure event taken when the wind speed is below the wind speed threshold, the current grid voltage is within the voltage threshold of the specified grid voltage, and power factor is within the power factor threshold of unity. Under these circumstances, the likelihood of a grid failure event, e.g., in the next hour may be relatively low. The general idea here is that all three indicia of potential grid problems (wind speed, voltage, and power factor) indicate that problems are relatively unlikely.

As an alternative, consider leaf node 630, which represents the opposite extreme of leaf node 616, e.g., the wind speed exceeds the wind speed threshold, voltage lags the specified voltage by more than the specified voltage percentage, and power factor deviates from unity by more than the specified power factor threshold. Under these circumstances, a grid failure in the next hour may be much more likely. Also, note that the grid failure likelihoods shown in FIG. 6 are merely examples to illustrate the principles discussed herein.

Note also that decision tree 600 is but one example of a decision tree that can be used consistent with the disclosed implementations. Other decision trees might layer the nodes in a different order, e.g., using voltage, power factor, frequency, or price for the root node, etc. In addition, the decision tree can be continually optimized over time and may grow new paths, change thresholds, delete old paths, etc.

In addition, other implementations may have actions associated with each of nodes 616-630. For example, node 616 may include actions that may be useful when a grid failure is relatively unlikely. These actions can include turning off battery charging, turning off generators, running low-priority services at the server installation, importing jobs from other server installations, etc. At the other end of the spectrum, node 630 may include actions that may be useful when a grid failure is fairly likely, e.g., actions to take before the failure occurs. These actions can include charging batteries, turning on generators, moving jobs from the server installation to other server installations on other grids (e.g., with lower failure probabilities), turning off low and/or high priority services, etc.

Second Example Algorithm

Figure 7:
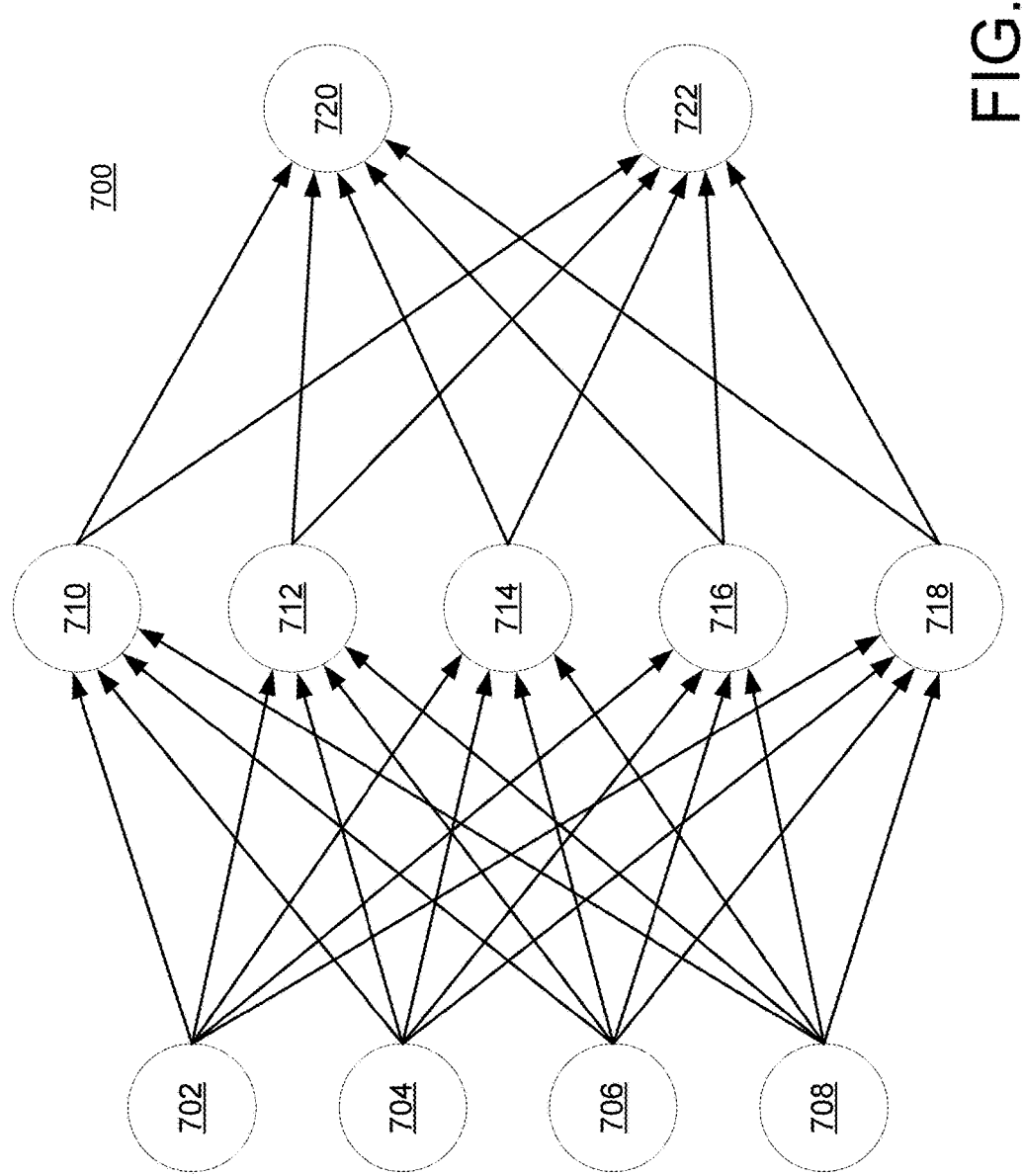

There are many different specific algorithms that can be used to predict the likelihood of a grid failure event. Decision tree 600 discussed above is one example of such an algorithm. FIG. 7 illustrates another such algorithm, a learning network 700 such as a neural network. Generally, learning network 700 can be trained to classify various signals as either likely to lead to failure or not likely to lead to failure.

Learning network 700 includes various input nodes 702, 704, 706, and 708 that can represent the different signals discussed herein. For example, input node 702 can represent power factor on a given grid, e.g., quantify the deviation of the power factor from unity. Input node 704 can represent voltage on the grid, e.g., can quantify the deviation of the voltage on the grid from the specified voltage. Input node 706 can represent a first weather condition on the grid, e.g., can represent wind speed. Input node 708 can represent another weather condition on the grid, e.g., can represent whether thunder and lightning are occurring on the grid.

Nodes 710, 712, 714, 716, and 718 can be considered "hidden nodes" that are connected to both the input nodes and output nodes 720 and 722. Output node 720 can represent a first classification of the input signals, e.g., output node 720 can be activated when a grid outage is relatively unlikely. Output node 722 can represent a second classification of the input signals, e.g., output node 722 can be activated instead of node 720 when the grid outage is relatively likely.

Algorithm Training

As noted above, decision tree 600 and learning network 700 are but two examples of various algorithms that can be used to predict the probability of a given grid failure event. Other algorithms include probabilistic (e.g., Bayesian) and stochastic methods, genetic algorithms, support vector machines, regression techniques, etc. The following describes a general approach that can be used to train such algorithms to predict grid failure probabilities.

As noted above, blocks 502 and 504 can include obtaining grid condition signals from different grids. These grid condition signals can be historical signals obtained over times when various failures occurred on the grids, and thus can be mined to detect how different grid conditions suggest that future failures are likely. In addition, other historical signals such as weather signals and server signals can also be obtained. The various historical signals for the different grids can be used as training data to train the algorithm. For example, in the case of the decision tree 600, the training data can be used to establish the individual thresholds used to determine which path is taken out of each node of the tree. In the case of the learning network 700, the training data can be used to establish weights that connect individual nodes of the network. In some cases, the training data can also be used to establish the structure of the decision tree and/or network.

Once the algorithm is trained, current signals for one or more grids can be evaluated to predict the likelihood of grid failures on those grids. For example, current grid conditions and weather conditions for many different grids can be evaluated, and individual grids can be designated as being at relatively high risk for a near-term failure. The specific duration of the prediction can be predetermined or learned by the algorithm, e.g., some implementations may predict failures on a very short time scale (e.g., within the next second) whereas other implementations may have a longer prediction horizon (e.g., predicted failure within the next 24 hours).

In some cases, the trained algorithm may take into account correlations between grid failures on different grids. For example, some grids may tend to experience failure events shortly after other grids. This could be due to a geographical relationship, e.g., weather patterns at one grid may tend to reliably appear at another grid within a fairly predictable time window. In this case, a recent grid failure at a first grid may be used to predict an impending grid failure on a second grid.

Furthermore, failure correlations may exist between different grids for other reasons besides weather. For example, relationships between different grids can be very complicated and there may be arrangements between utility companies for coordinated control of various grids that also tend to manifest as correlated grid failures. Different utilities may tend to take various actions on their respective grids that tend to cause failures between them to be correlated.

There may also be physical connections between different grids that tend to cause the grids to fail together. For example, many regional grids in very different locations may both connect to a larger interconnect grid. Some of these regional grids may have many redundant connections to one another that enables them to withstand grid disruptions, whereas other regional grids in the interconnect grid may have relatively fewer redundant connections. The individual regional grids with less redundant connectivity may tend to experience correlated failures even if they are geographically located very far from one another, perhaps due to conditions present on the entire interconnect. Thus, in some cases, the algorithms take into account grid connectivity as well.

One specific way to represent correlations between grid failures is using conditional probabilities. For example, consider three grids A, B, and C. If there have been 100 failures at grid A in the past year and 10 times grid C suffered a failure within 24 hours of a grid A failure, then this can be expressed as a 10% conditional probability of a failure at grid C within 24 hours of a failure at grid A. Some implementations may combine conditional probabilities, e.g., by also considering how many failures occurred on grid B and whether subsequent failures occurred within 24 hours on grid C. If failures on grid C tend to be highly correlated with both failures on grid A and failures on grid B, then recent failure events at both grids A and B can be stronger evidence of a likely failure on grid C than a failure only on grid A or only on grid B.

Algorithm Outputs

In FIG. 6, decision tree 600 is shown outputting failure probabilities and in FIG. 7, learning network 700 is shown outputting a binary classification of either low failure risk (activate node 720) or high failure risk (activate node 722). These outputs are merely examples and many different possible algorithmic outputs can be viewed as predictive of the likelihood of failure on a given grid.

For example, some algorithms can output not only failure probabilities, but also the expected time and/or duration of a failure. The expected duration can be useful because there may be relatively short-term failures that a given server installation can handle with local energy storage, whereas other failures may require on-site power generation. If for some reason it is disadvantageous (e.g., expensive) to turn on local power generation at a server installation, the server installation may take different actions depending on whether on-site power generation is expected to be needed.

For example, assume the algorithm predicts that there is an 80% chance that a failure will occur but will not exceed 30 minutes. If the server installation has enough stored energy to run for 50 minutes, the server installation may continue operating normally. This can mean the server installation leaves local generators off, leaves servers in their current power consumption states, and does not transfer jobs to other server installations. On the other hand, if the algorithm predicts there is an 80% chance that the failure will exceed 50 minutes, the server installation might begin to transfer jobs to other server installations, begin turning on local generators, etc.

Further implementations may predict the availability of computational resources given predicted grid failures as well as other considerations. For example, given a 60% probability of a grid failure expected to last one hour and local energy storage currently charged at 50%, the algorithm might predict with 70% certainty that 5 server cores and 10 gigabytes of random-access memory will still be available in 10 hours without reverting to local power generation. Different factors can adjust this certainty, e.g. if the probability of the grid failure is 70% and the batteries are currently charged to only 40%, this might mean the algorithm predicts that 5 cores/10 gigabytes of RAM are available with only 40% certainty, or that 3 cores/6 gigabytes of RAM are available with 70% certainty.

Server Installation Coordination

The aforementioned discussion focused largely on how individual failure events can be predicted at individual grids. In further implementations, many different grids are evaluated concurrently and server installations located on these individual grids can be coordinated. For example, refer back to FIG. 4. Assume that failures at server installation 424 and 444 are very highly correlated, and that a failure has already occurred at server installation 424. In isolation, it may make sense to transfer jobs from server installation 444 to server installation 428. However, it may be that failures at server installation 428 are also correlated to failures at server installation 424, albeit to a lesser degree. Intuitively, this could be due to relationships shown in hierarchy 400, e.g., both server installations 424 and 428 are connected to grid 406.

Given these circumstances, it may be preferable to transfer jobs from server installation 444 to another server installation that is not on grid 406, e.g., server installation 420 and/or 436. Perhaps server installation 420, however, has sensed recent wide fluctuations in power quality signals in its connection to substation 410, whereas server installation 436 has sensed very steady power quality in its connection to substation 418. Under these circumstances, the algorithm may predict a higher probability of failure at server installation 420 than at 436. Thus, it may be preferable to transfer jobs from server installation 444 to server installation 436 instead of server installation 420. In some implementations, the control system 110 may be configured to instruct different server installations to transfer jobs as well as perform various hardware actions, as discussed more below.

More generally, given various signals sensed by different server installations on different grids and/or connected to different substations, it is possible for the control system 110 to coordinate processing by the server installations from a more global, coordinated perspective. The decision about where to transfer a given job can take into account conditions that are specific to individual grids or substations.

Power Consumption and Transfer

In some cases, grid failure predictions are applied by implementing policies about how to control local servers and power hardware without consideration of input from the grid operator. This may be beneficial from the standpoint of the server installation, but not necessarily from the perspective of the grid operator. Thus, in some implementations, the specific actions taken by a given server installation can also consider requests from the grid operator.

For example, in some cases, a grid operator may explicitly request that a given server installation reduce its power consumption for a brief period to deal with a temporary demand spike on a given grid. In other cases, a grid operator may explicitly request that a given server installation turn on its fossil fuel generators to provide reactive power to a given grid to help with power factor correction on that grid. These requests can influence which actions a given server installation is instructed to take in response to predicted failure events.

For example, again referring to FIG. 4, assume server installations 424 and 428 both receive explicit requests from a grid operator of grid 406 to reduce their power consumption to help address a temporary demand spike on grid 406. The control system 110 may obtain signals from server installation 424 resulting in a prediction that a grid failure is relatively unlikely for consumers connected to substation 412, whereas signals received from server installation 428 may result in a prediction that a grid failure is very likely for consumers connected to substation 414. Under these circumstances, the control system may instruct server installation 424 to comply with the request by reducing its net power consumption—discharging batteries, placing servers into low-power consumption states, turning on generators, etc. On the other hand, the control system may determine that the risk of grid failure at server installation 428 is too high to comply with the request and may instead instruct server installation 428 begin charging its batteries and place additional servers into higher power consumption states in order to accomplish as much computation work as possible before the failure and/or transfer jobs to a different server installation before the predicted failure.

In cases such as those shown in FIG. 2 where a given server installation is configured to provide net power to the grid, this approach can be taken further. In this example, the control system 110 can instruct server installation 424 to provide net power to the grid in response to the request. In some cases, the grid operator may specify how much net power is requested and server installation 424 may be instructed to take appropriate actions to provide the requested amount of power to the grid. Specifically, the control system may determine various energy hardware actions and server actions that will cause the server installation 424 to provide the requested amount of power to the grid.

Device Implementations

Referring back to FIG. 1, environment 100 as shown includes several components. In this case, for purposes of explanation, the components are characterized as a control system 110, client device 130, and server installations 140, 150, and 160. In this example, the control system can be manifest as a server computing device, desktop, tablet, laptop device, etc. Likewise, each of the modules shown in FIG. 1 can be embodied on such a computing device. Of course not all device implementations can be illustrated and other device implementations should be apparent to the skilled artisan from the description above and below.

The term "device," "computer," "computing device," "client device," and or "server device" as used herein can mean any type of device that has some amount of hardware processing capability (e.g., processing resources 111, 141, 151, and 161) and/or hardware storage/memory capability (e.g., memory/storage resources 112, 142, 152, and 162). Processing capability can be provided by one or more processors (e.g., hardware processing units/cores) that can execute computer-readable instructions to provide functionality. Computer-readable instructions and/or data can be stored on storage, such as storage/memory and or a data store.

The storage/memory can be internal or external to the device. The storage can include any one or more of volatile or non-volatile memory, hard drives, flash storage devices, and/or optical storage devices (e.g., CDs, DVDs, etc.), among others. As used herein, the term "computer-readable media" can include signals. In contrast, the term "computer-readable storage media" excludes signals. Computer-readable storage media includes "computer-readable storage devices." Examples of computer-readable storage devices include volatile storage media, such as RAM, and non-volatile storage media, such as hard drives, optical discs, and flash memory, among others.

In some cases, the devices are configured with a general purpose processor and storage/memory. In other cases, a device can include a system on a chip (SOC) type design. In SOC design implementations, functionality provided by the device can be integrated on a single SOC or multiple coupled SOCs. One or more associated processors can be configured to coordinate with shared resources, such as memory, storage, etc., and/or one or more dedicated resources, such as hardware blocks configured to perform certain specific functionality. Thus, the term "processor" as used herein can also refer to central processing units (CPUs), graphical processing units (CPUs), controllers, microcontrollers, processor cores, or other types of processing devices suitable for implementation both in conventional computing architectures as well as SOC designs.

In some configurations, the various modules shown in FIG. 1 can be installed as hardware, firmware, or software during manufacture of the device or by an intermediary that prepares the device for sale to the end user. In other instances, the end user may install these modules later, such as by downloading executable code and installing the executable code on the corresponding device. Also note that devices generally can have input and/or output functionality. For example, computing devices can have various input mechanisms such as keyboards, mice, touchpads, voice recognition, etc. Devices can also have various output mechanisms such as printers, monitors, etc.

Also note that the devices described herein can function in a stand-alone or cooperative manner to implement the described techniques. For example, method 500 can be performed on a single computing device and/or distributed across multiple computing devices that communicate over network(s) 120. Without limitation, network(s) 120 can include one or more local area networks (LANs), wide area networks (WANs), the Internet, and the like.

As noted above, in some cases the control system 110 can manipulate the computational resources used for computing jobs at a given server installation. The term "computational resources" broadly refers to individual computing devices, storage, memory, processors, virtual machines, time slices on hardware or a virtual machine, computing jobs/tasks/processes/threads, etc. Any of these computational resources can be manipulated in a manner that affects the amount of power consumed by a server installation at any given time.

Further Examples

The various examples discussed herein can include a first control system example having a hardware processor and a hardware computer-readable storage medium storing computer-readable instructions. The computer-readable instructions can, when executed, cause the hardware processor to implement a grid analysis module and an action causing module. The grid analysis module can be configured to obtain first grid condition signals describing first grid conditions detected by a first server installation during a first time period. The first server installation can be connected to a first electrical grid and a previous grid failure event can have occurred on the first electrical grid during the first time period. The grid analysis module can also be configured to use the first grid condition signals to obtain a prediction of a future failure event on a second electrical grid. The action module can be configured to, based on the prediction, cause an adjustment to an energy storage state of an energy storage device or a current generator state of a generator at a second server installation that is connected to the second electrical grid.

In a second control system example, the action causing module of the first control system example can be configured to cause the energy storage device to begin charging. In a third control system example, the action causing module of the first control system example or the second control system example can be configured to cause the generator to turn on or off. In a fourth control system example, the action causing module of the first through third control system examples can be configured to cause a server action on a server at the second server installation. In a fifth control system example, the server action of the fourth control system example can include throttling a service that is currently executing on the server at the second server installation. In a sixth control system example, the server action of the fourth control system example or the fifth control system example can include placing the server at the second server installation into a different power consumption state. In a seventh control system example, the server action of the fourth through sixth control system examples can include transferring a job from the server at the second server installation to another server installation. In an eighth control system example, the server action of the fourth through seventh control system examples can include, based on the prediction, identifying a deferrable job at the second server installation that is scheduled to be performed during or after a predicted time of the future failure event and rescheduling the deferrable job prior to the predicted time of the future failure event.

The various examples discussed herein can include a first method example that can be performed by a hardware processor. The first method example can include obtaining first grid condition signals describing first grid conditions detected by a first server installation during a first time period. The first server installation can be connected to a first electrical grid and first previous grid failure events can have occurred on the first electrical grid during the first time period. The first method example can also include obtaining second grid condition signals describing second grid conditions detected by a second server installation during a second time period. The second server installation can be connected to a second electrical grid and second previous grid failure events can have occurred on the second electrical grid during the second time period. The first method example can also include performing an analysis of the first grid conditions and the second grid conditions and predicting a likelihood of a future grid failure event based on the analysis.

In a second method example, the likelihood of the future grid failure event of the first method example is predicted for the second electrical grid. In a third method example, the analysis of the first method example or the second method example includes identifying historical correlations between the first previous grid failure events and the second previous grid failure events. In a fourth method example, the likelihood of the future grid failure event of the first through third method examples is predicted for a third electrical grid that is geographically remote from both the first electrical grid and the second electrical grid. In a fifth method example, the analysis of the first through fourth method examples includes training a learning algorithm to perform the predicting and using the first grid condition signals and the second grid condition signals as training data for the learning algorithm The various examples discussed herein can include an additional first method example that can performed by a hardware processor. The additional first method example can include obtaining first grid condition signals describing first grid conditions detected by a first server installation during a first time period. The first server installation can be connected to a first electrical grid and first previous grid failure events can have occurred on the first electrical grid during the first time period. The additional first method example can also include obtaining second grid condition signals describing second grid conditions detected by a second server installation during a second time period. The second server installation can be connected to a second electrical grid that is geographically remote from the first electrical grid and second previous grid failure events can have occurred on the second electrical grid during the second time period. The additional first method example can also include performing an analysis of the first grid condition signals and the second grid condition signals to identify a correlation between the first previous grid failure events on the first electrical grid and the second grid failure events on the second electrical grid, and using the correlation to predict a likelihood of a future grid failure event on the second electrical grid based on a recent grid failure event on the first electrical grid.

In a second additional method example, the first additional method example includes identifying the correlation by calculating a conditional probability of the future grid failure event on the second electrical grid given the recent grid failure event on the first electrical grid. In a third additional method example, the first grid condition signals of the first additional method example or the second additional method example describe voltage drop on the first electrical grid. In a fourth additional method example, the first grid condition signals of the first through third additional method examples describe frequency of alternating current on the first electrical grid or the first grid condition signals indicate whether power factor is leading or lagging on the first electrical grid.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and other features and acts that would be recognized by one skilled in the art are intended to be within the scope of the claims.

The invention claimed is:
1. A system comprising:
a hardware processor; and
a hardware computer-readable storage medium storing computer-readable instructions which, when executed by the hardware processor, cause the hardware processor to:
train an algorithm using historical grid condition signals obtained from a first electrical grid and a second electrical grid, the historical grid condition signals reflecting historical failures on the first electrical grid and the second electrical grid, the first electrical grid being geographically remote from the second electrical grid;

obtain current first grid condition signals describing first grid conditions detected by a first data center, wherein the first data center is connected to the first electrical grid;

evaluate the current first grid condition signals using the trained algorithm to make a prediction of a future failure event on the second electrical grid; and prior to occurrence of the future failure event, cause an adjustment to a local energy storage device or a local generator at a second data center that is connected to the second electrical grid, the local energy storage device or the local generator powering multiple servers at the second data center.

2. The system of claim 1, wherein the adjustment causes the local energy storage device to begin charging.

3. The system of claim 1, wherein the adjustment causes the local generator to turn on or off.

4. The system of claim 1, wherein the adjustment causes a server action on a particular server at the second data center.

5. The system of claim 4, wherein the server action comprises throttling data processing on the particular server at the second data center.

6. The system of claim 4, wherein the server action comprises configuring the particular server at the second data center into a different power consumption state.

7. The system of claim 4, wherein the server action comprises transferring at least some data processing from the particular server at the second data center to a third data center.

8. The system of claim 4, wherein the server action comprises:
based at least on the prediction, identifying a deferrable job at the second data center that is scheduled to be performed during or after a predicted time of the future failure event; and
rescheduling the deferrable job prior to the predicted time of the future failure event.

9. A method comprising:
obtaining current first grid condition signals describing first grid conditions detected by a first server farm, wherein the first server farm is connected to a first electrical grid;
evaluating the current first grid condition signals using a trained algorithm to make a prediction of a future failure event on a second electrical grid that is geographically remote from the first electrical grid, the trained algorithm being trained using historical grid condition signals obtained from the first electrical grid and the second electrical grid, the historical grid condition signals reflecting historical failures on the first electrical grid and the second electrical grid; and
based at least on the prediction and prior to an occurrence of the future failure event, causing an adjustment to a local energy storage device or a local generator at a second server farm that is connected to the second electrical grid, the local energy storage device or the local generator powering multiple servers at the second server farm.

10. The method of claim 9, further comprising training the algorithm.

11. The method of claim 9, wherein the local energy storage device is a local battery at the second server farm, the second server farm can draw power from both the local battery and the second electrical grid, and the adjustment includes charging the local battery at the second server farm using electrical power from the second electrical grid.

12. The method of claim 11, further comprising:
drawing a targeted electrical load on the second electrical grid by charging the local battery at a specified wattage.

13. The method of claim 11, further comprising:
reducing an electrical load on the second electrical grid by discharging the local battery at a specified wattage.

14. The method of claim 13, further comprising:
evaluating previous discharge cycles performed on the local battery at the second server farm; and
determining an amount to discharge the local battery based at least on the previous discharge cycles.

15. The method of claim 9, wherein the second server farm has the local generator, the second server farm can draw power from both the local generator and the second electrical grid, and the adjustment includes changing a current generator state of the local generator.

16. The method of claim 15, wherein the adjustment comprises turning on the local generator.

17. The method of claim 15, wherein the adjustment comprises synchronizing sine waves of local power from the local generator with grid power from the second electrical grid.

18. A system comprising: a hardware processor; and
a hardware computer-readable storage medium storing computer-readable instructions which, when executed by the hardware processor, cause the hardware processor to:
obtain current first grid condition signals describing first grid conditions detected by a first data center that is connected to a first electrical grid;
evaluate the current first grid condition signals using a trained algorithm to make a prediction of a future failure event on a second electrical grid that is geographically remote from the first electrical grid, the trained algorithm being trained using historical grid condition signals obtained during historical grid failures; and
based at least on the prediction and prior to occurrence of the future failure event, cause an adjustment to a local energy storage device or a local generator at a second data center that is connected to the second electrical grid, the local energy storage device or the local generator powering multiple servers at the second data center.

19. The system of claim 18, the historical grid failures including first historical grid failures that occurred on the first electrical grid and second grid failures that occurred on the second electrical grid.

20. The system of claim 18, the prediction comprising a conditional probability of the future failure event occurring on the second electrical grid given a recent failure event on the first electrical grid.

21. The system of claim 18, wherein the computer-readable instructions, when executed by the hardware processor, cause the hardware processor to:
identify a predicted duration of the future failure event;
determine whether to transfer jobs from the second data center to a third data center based at least on the predicted duration of the future failure event;
in a first instance when the predicted duration exceeds a specified duration, transfer an individual job from the second data center to the third data center; and
in a second instance when the predicted duration does not exceed the specified duration, refrain from transferring another individual job from the second data center to the third data center.

* * * * *